Jan. 12, 1932.  A. G. RAYBURN  1,840,873
FLUID OPERATED POWER TRANSMISSION
Filed April 1, 1927   15 Sheets-Sheet 2
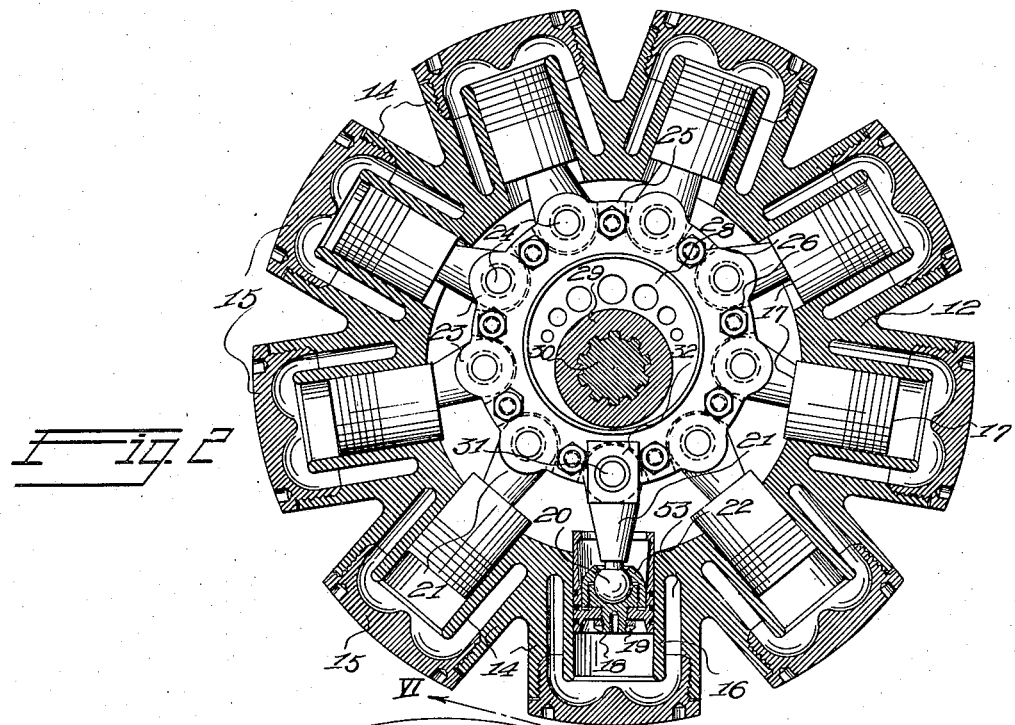
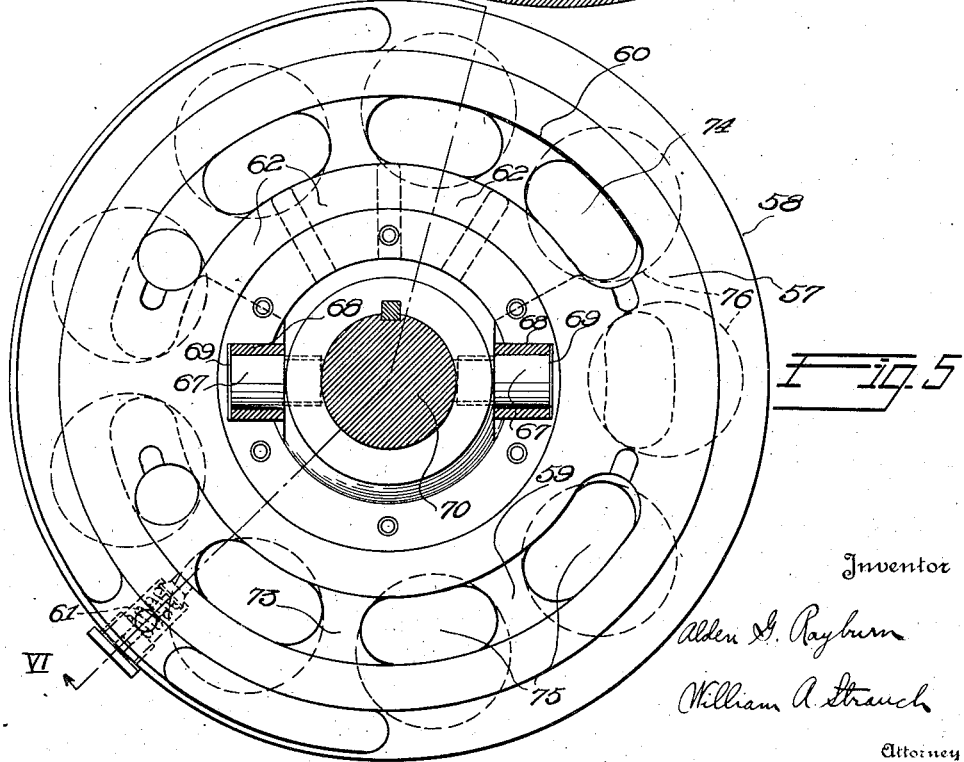

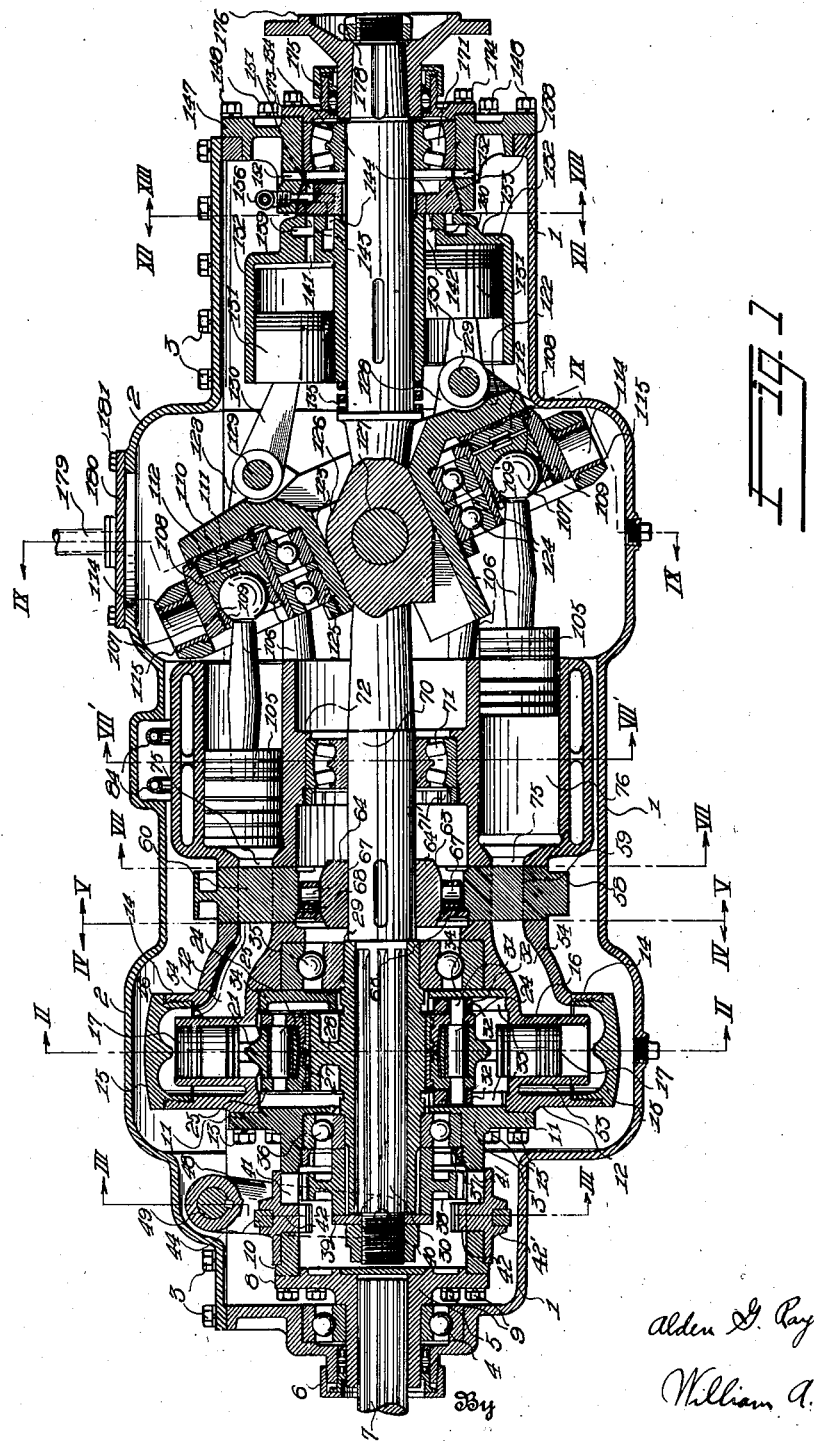

Jan. 12, 1932. A. G. RAYBURN 1,840,873
FLUID OPERATED POWER TRANSMISSION
Filed April 1, 1927 15 Sheets-Sheet 3
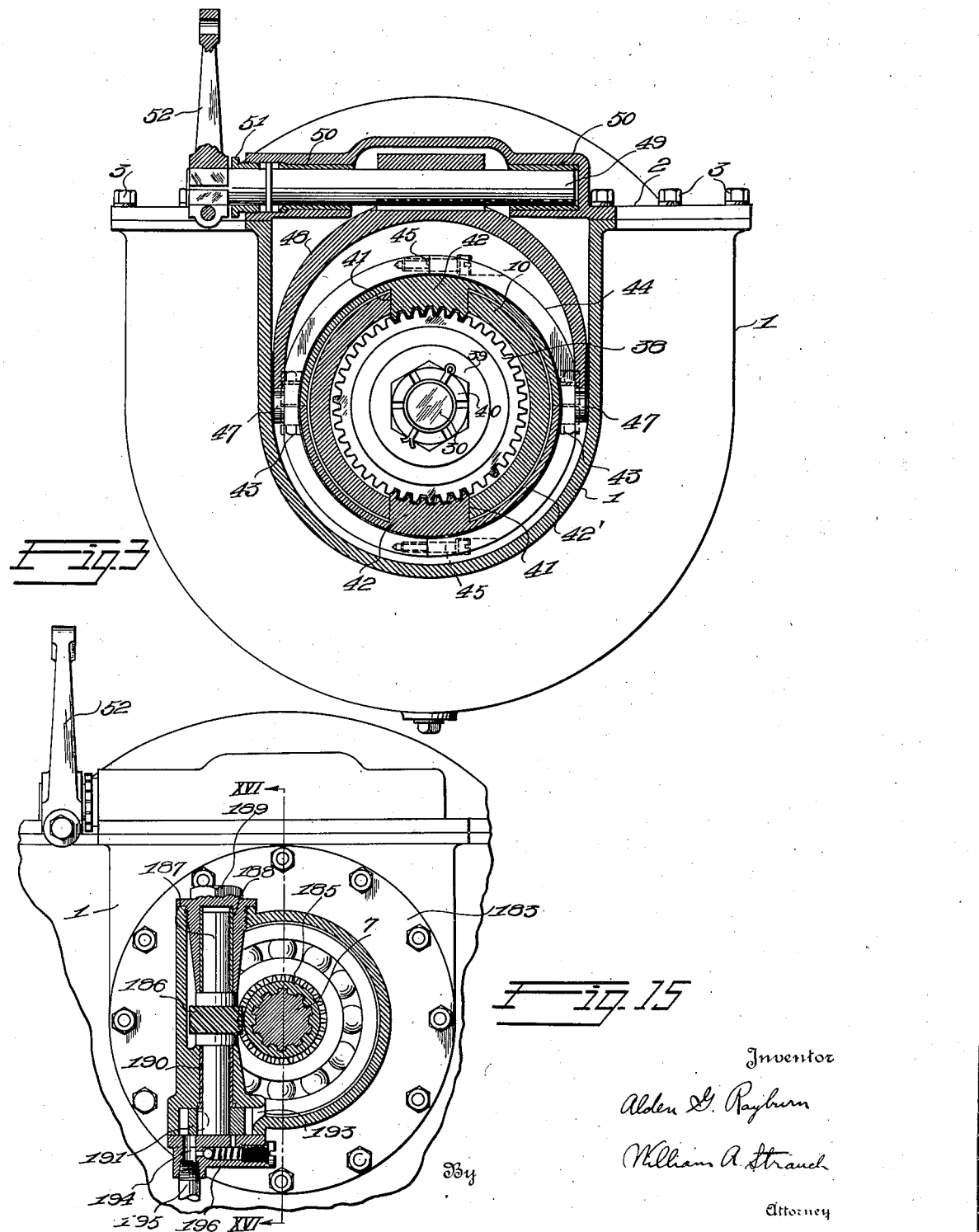

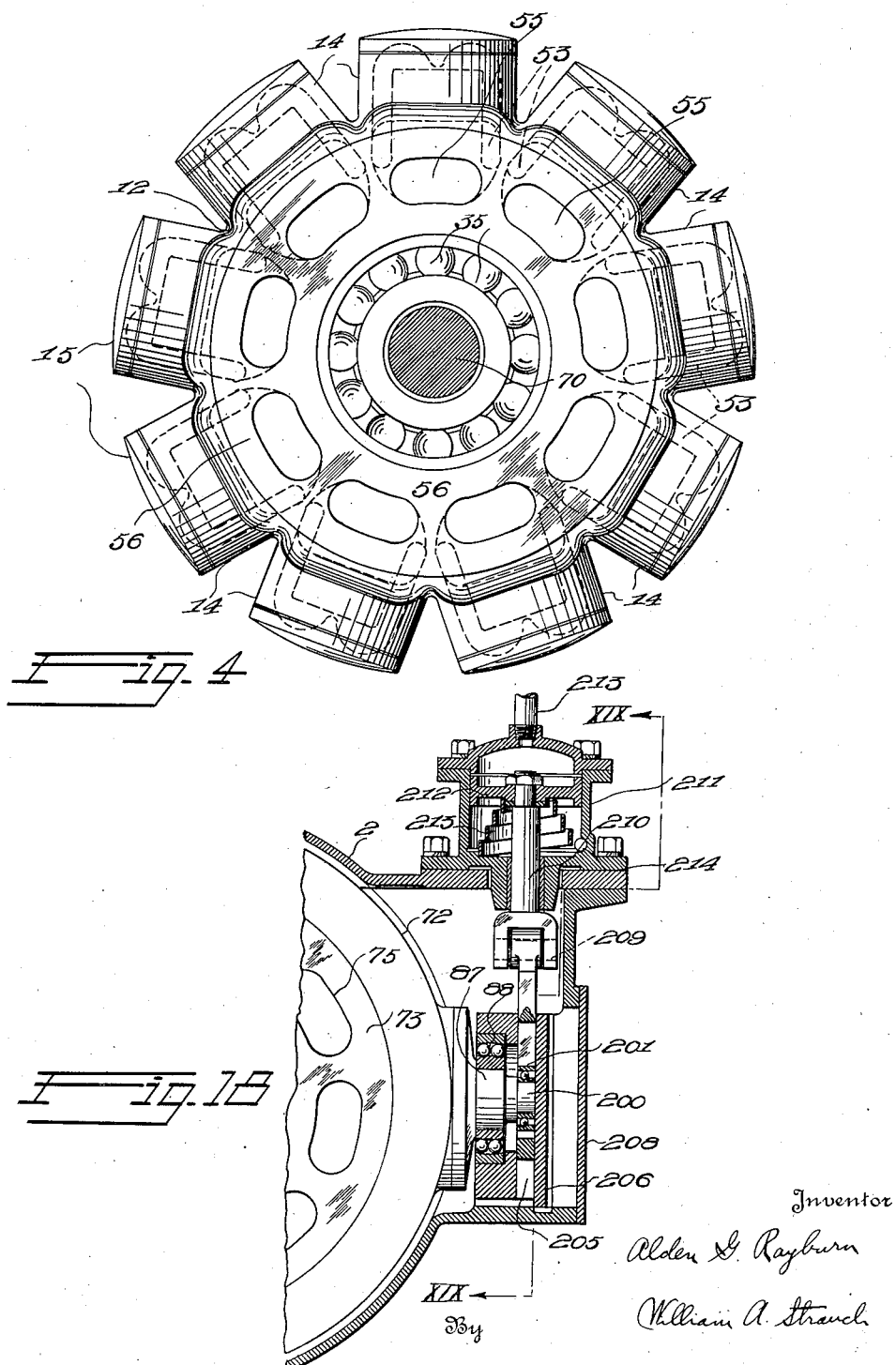

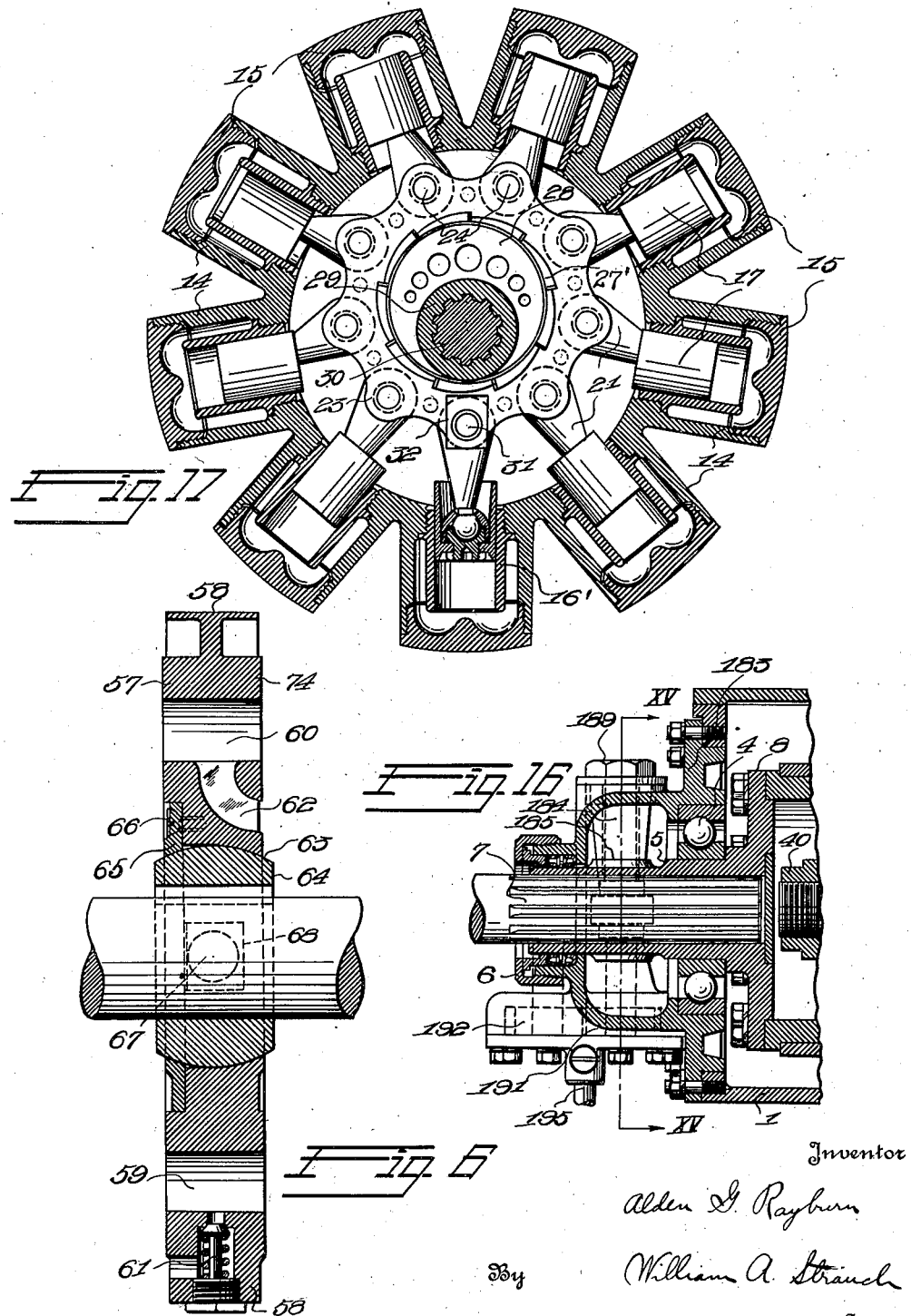

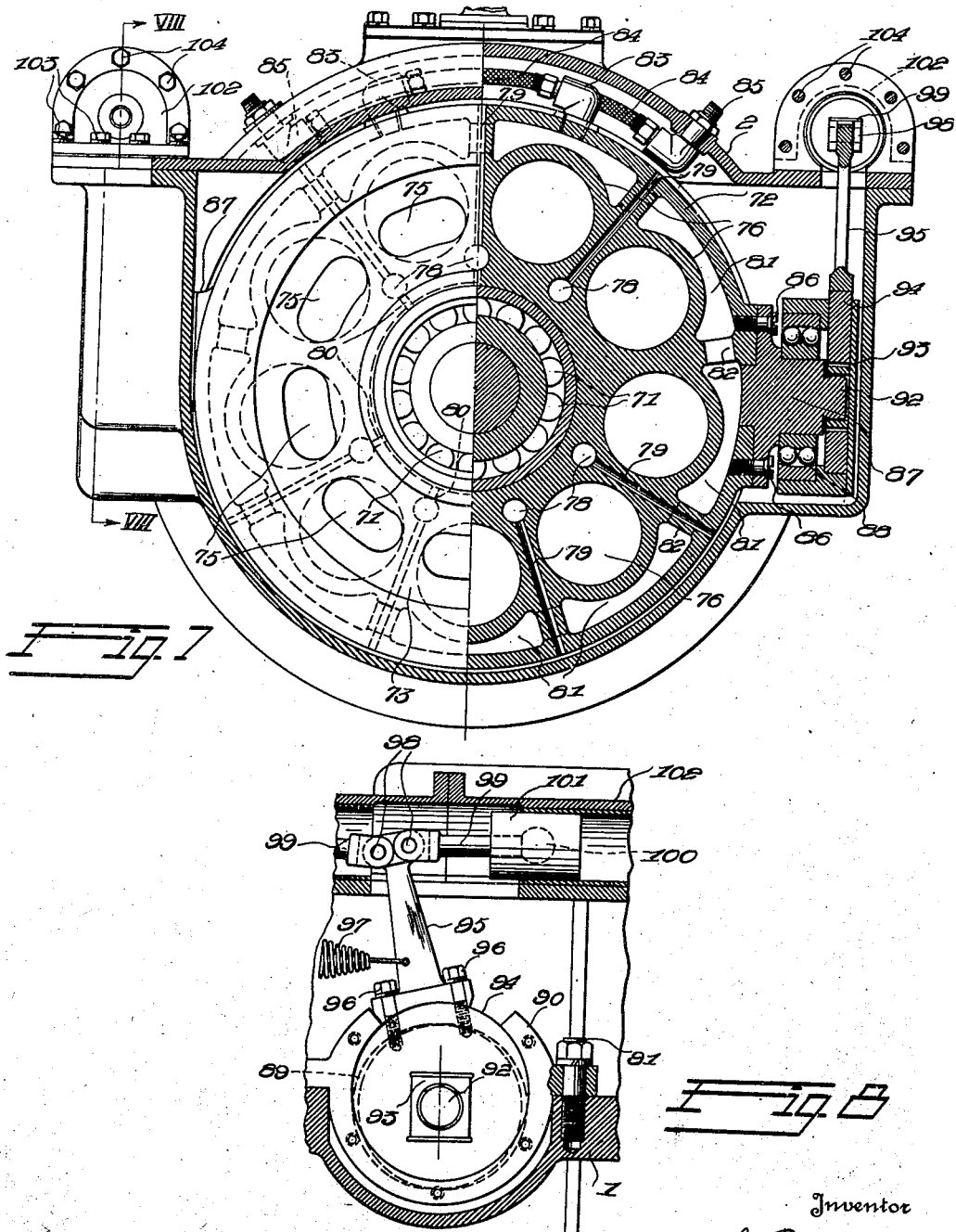

Jan. 12, 1932.   A. G. RAYBURN   1,840,873
FLUID OPERATED POWER TRANSMISSION
Filed April 1, 1927   15 Sheets-Sheet 7
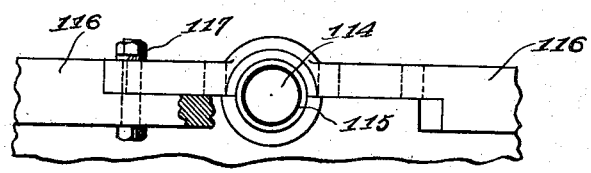
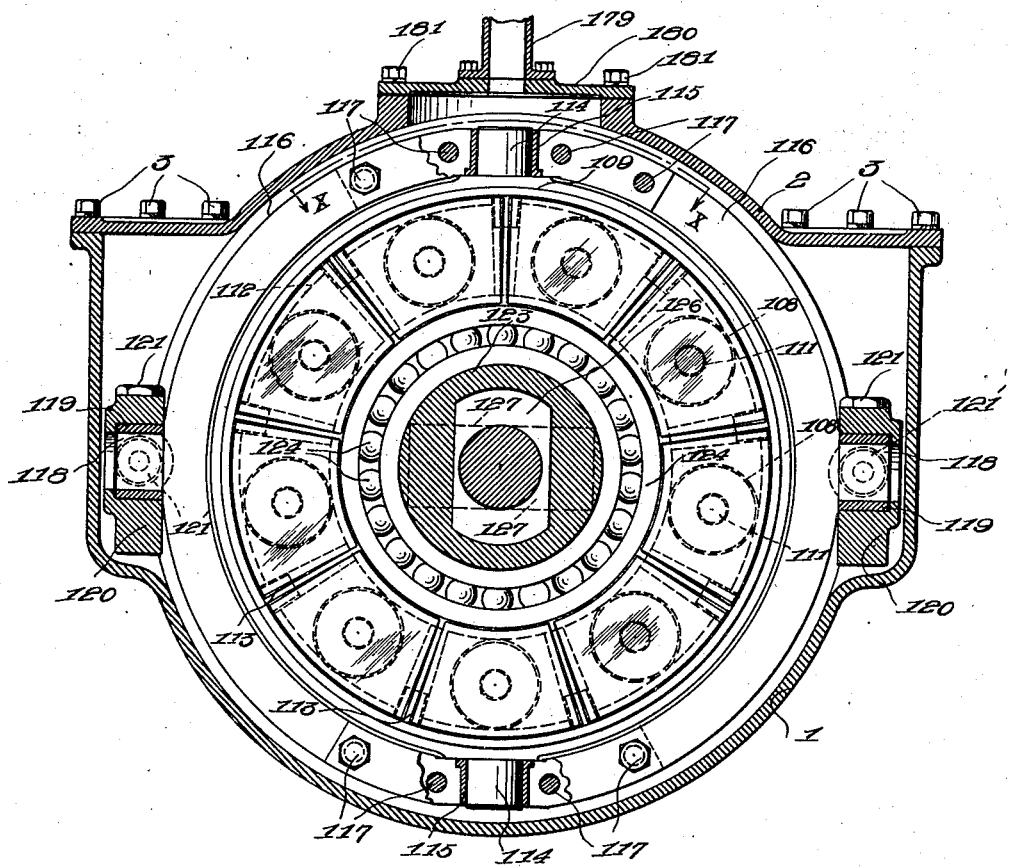
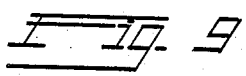

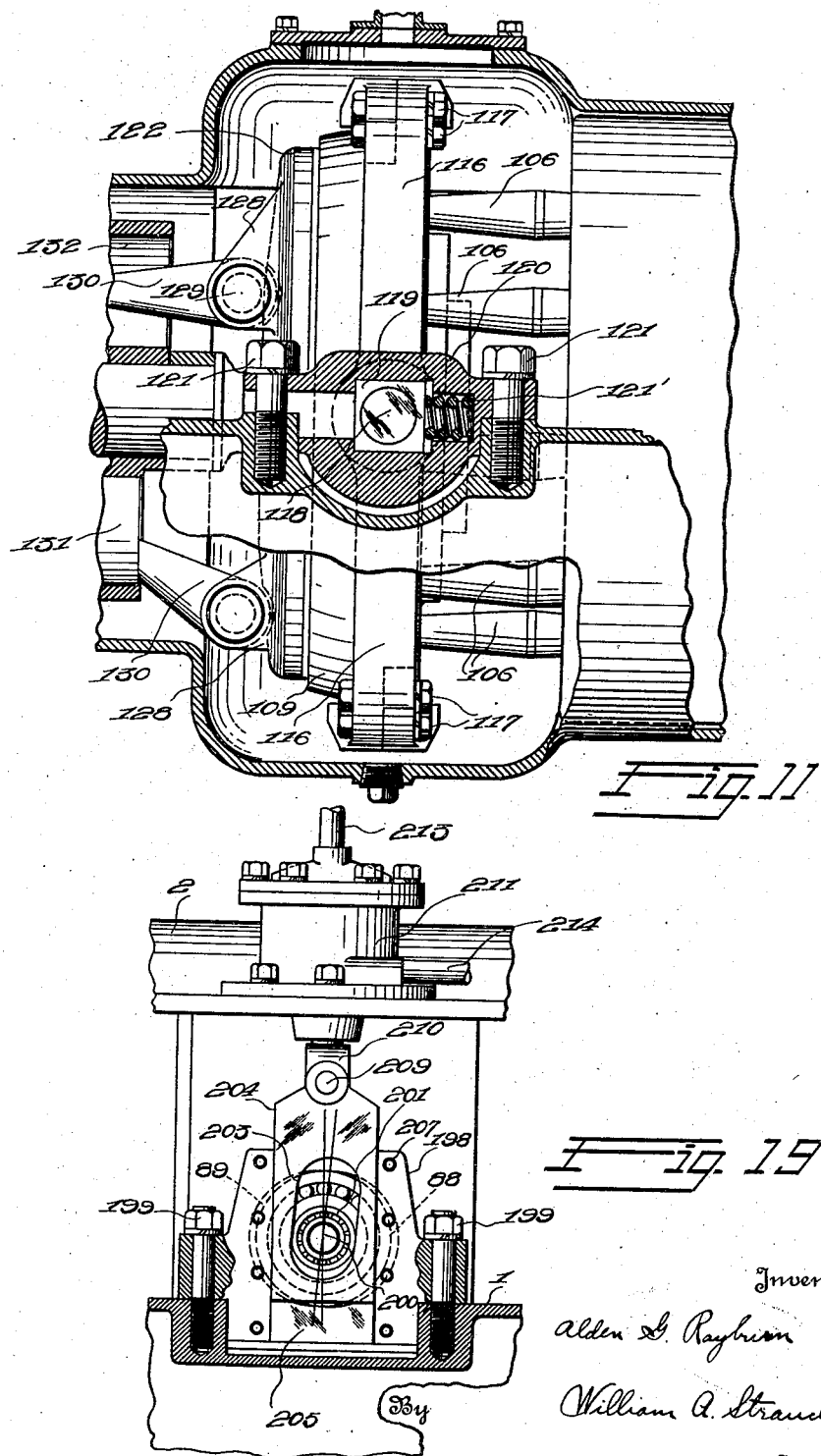

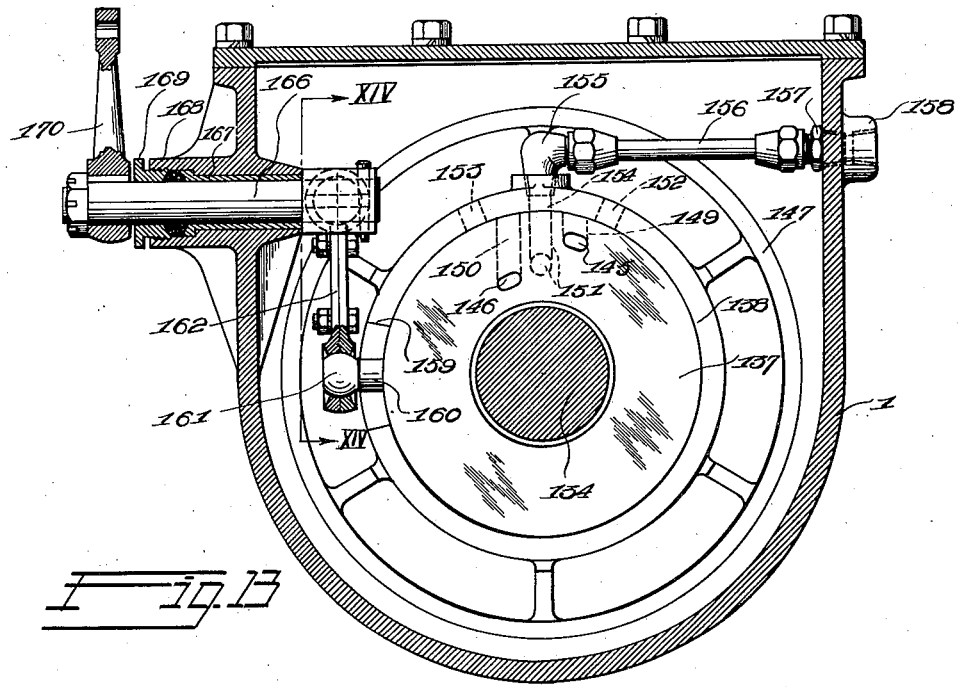
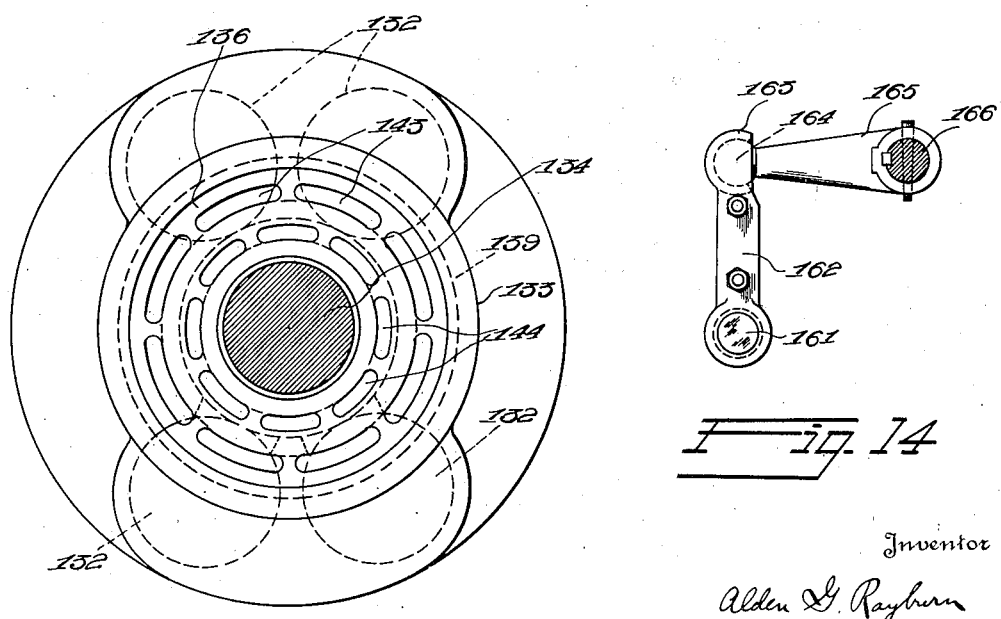

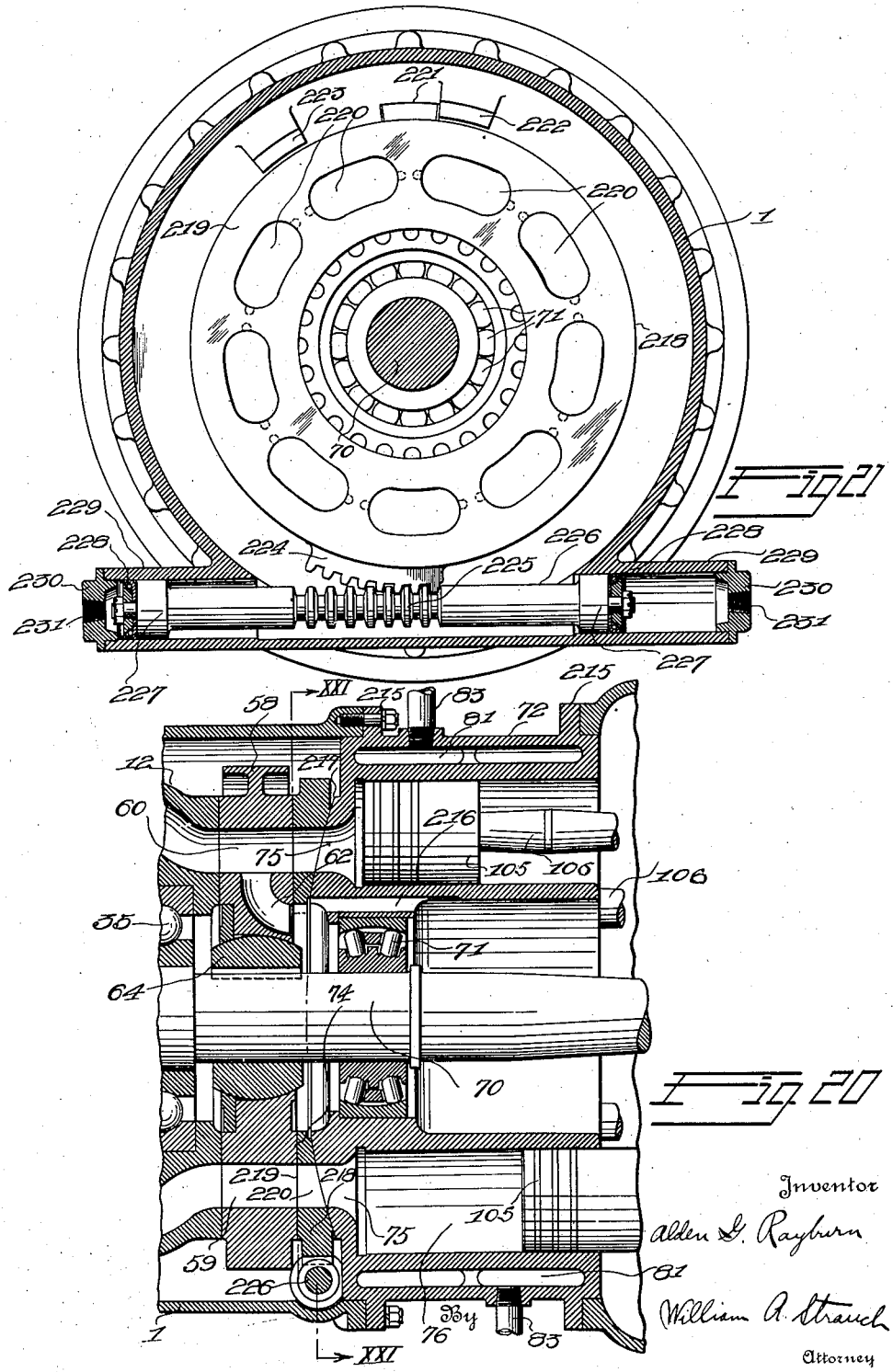

Jan. 12, 1932.  A. G. RAYBURN  1,840,873
FLUID OPERATED POWER TRANSMISSION
Filed April 1, 1927  15 Sheets-Sheet 11
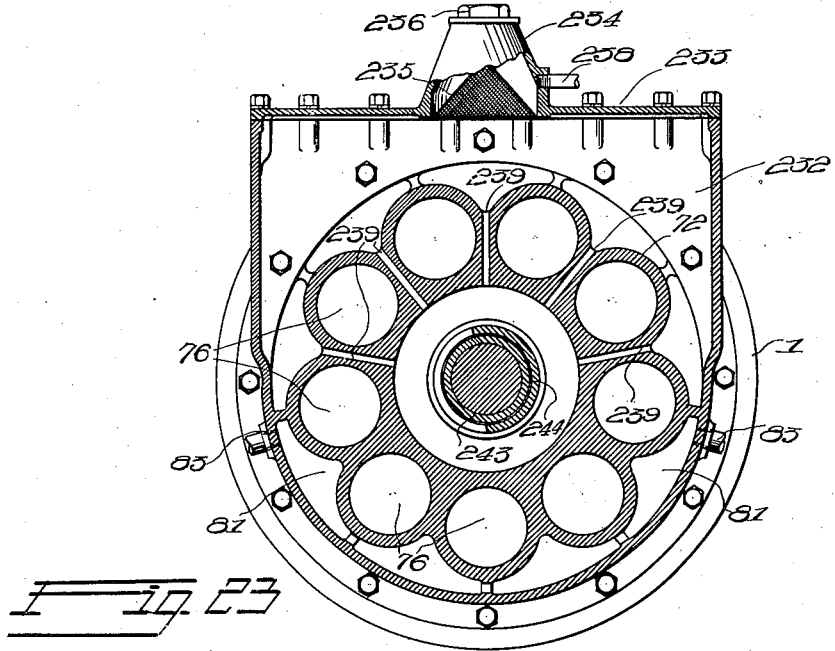
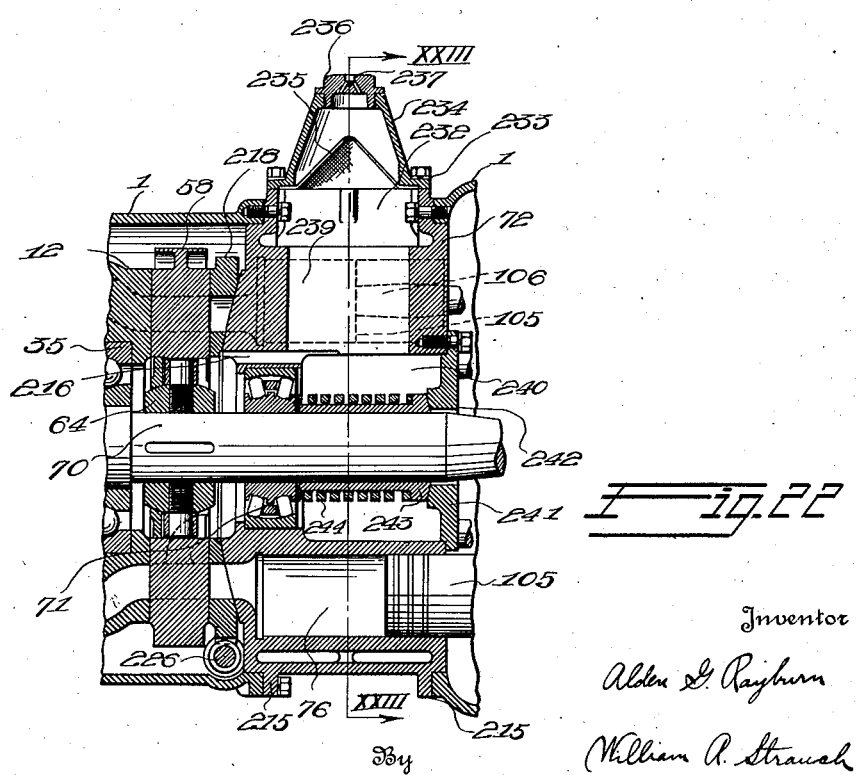
Inventor
Alden G. Rayburn
William A. Strauch
By
Attorney

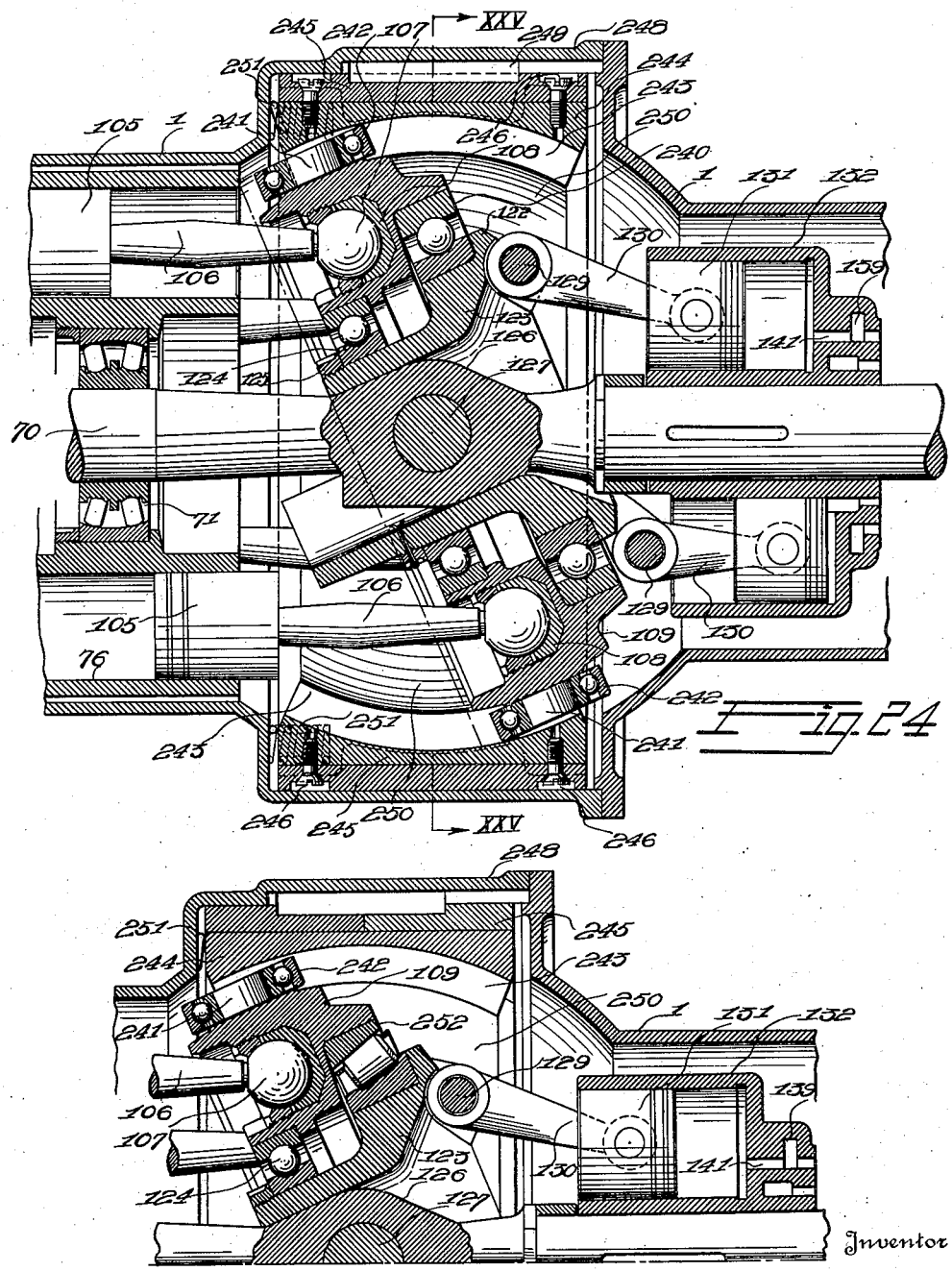

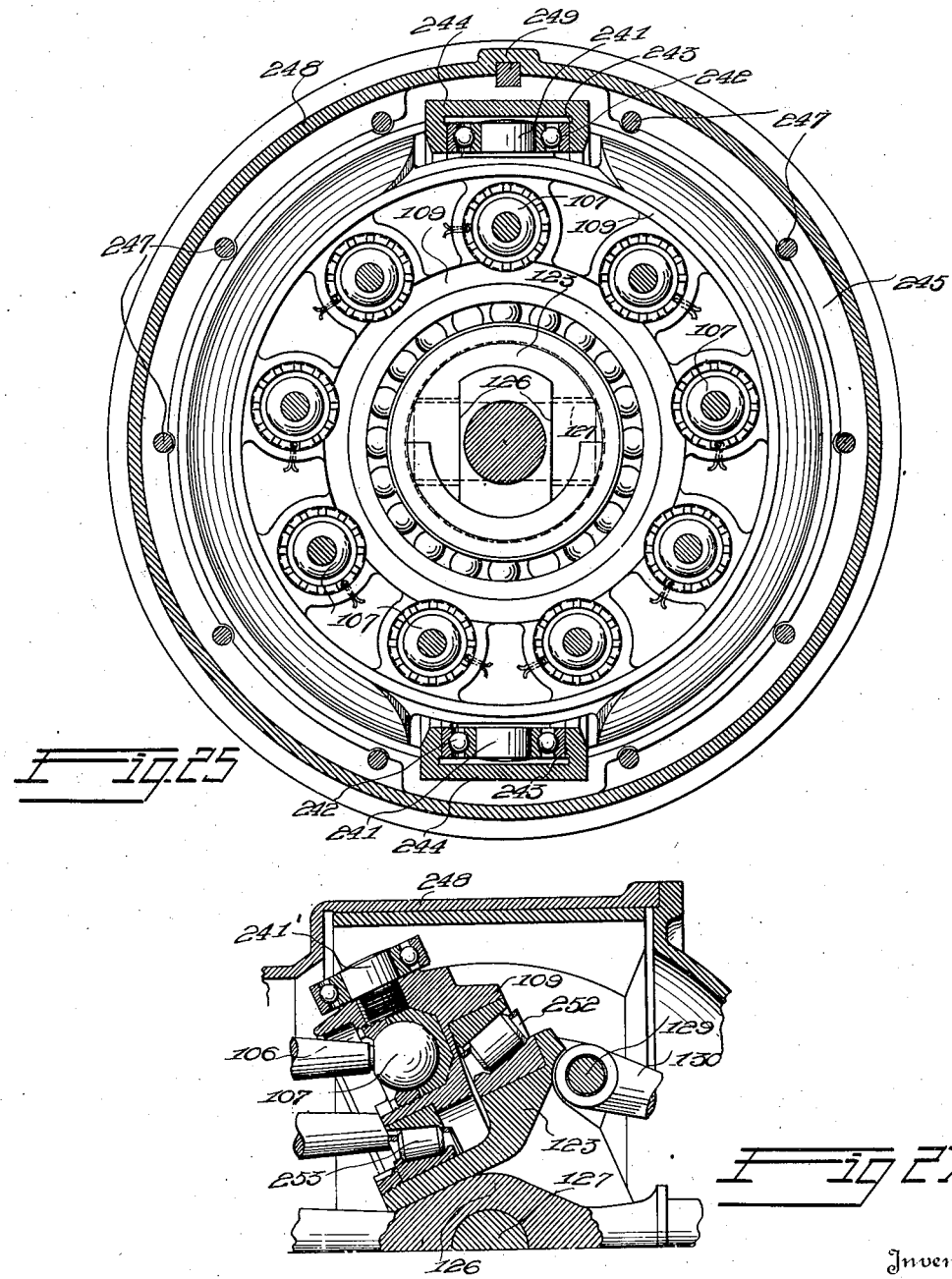

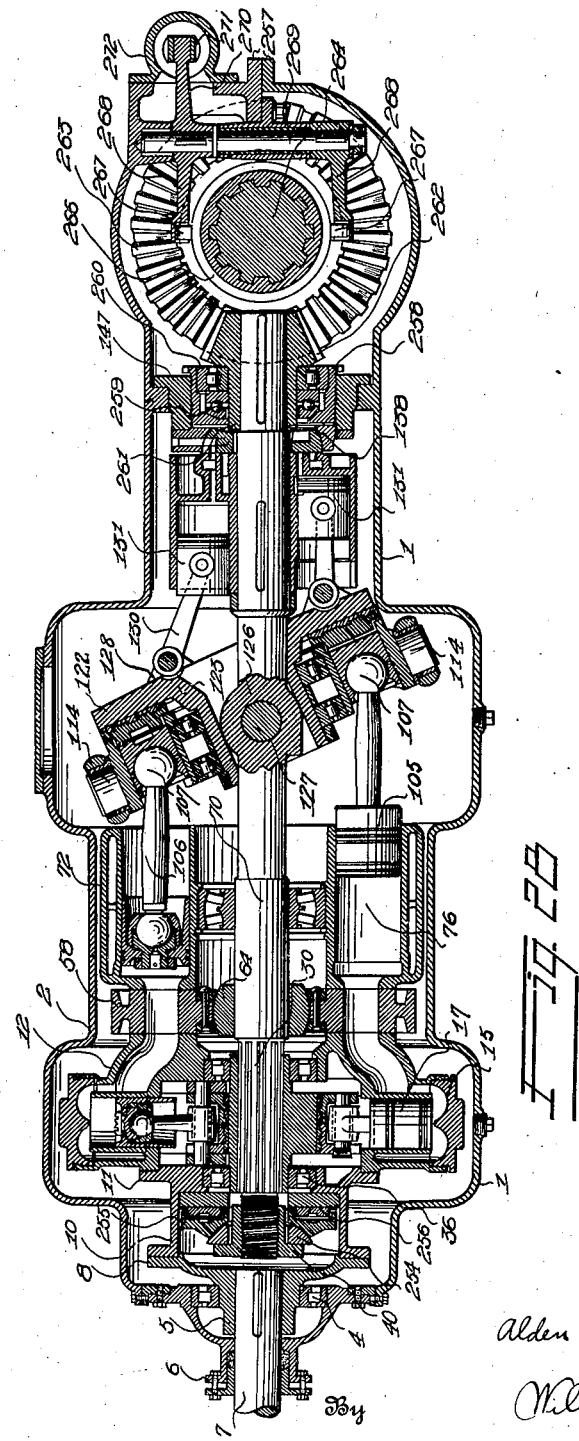

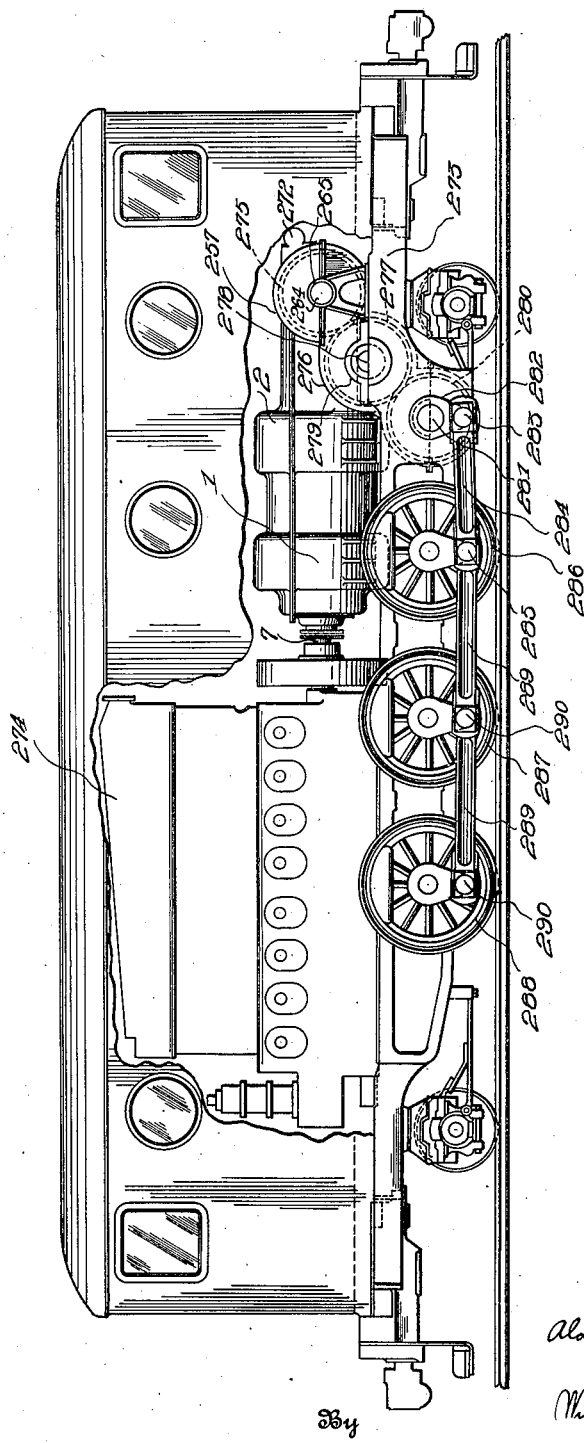

Patented Jan. 12, 1932

1,840,873

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

FLUID OPERATED POWER TRANSMISSION

Application filed April 1, 1927. Serial No. 180,308.

The present invention relates to power transmissions, and more particularly to torque multiplying and speed varying fluid power transmissions of the type in which the operating fluid comes to rest when the driving and driven members are rotated at the same speed.

A primary object of the invention is to provide simplified hydraulic transmissions of the type mentioned in which the resistance to flow of fluid is reduced to a minimum, and which are adaptable for the transmission of small as well as large powers and for relatively high speed operation.

Further objects of the invention are such as may be attained by a utilization of the various combinations, subcombinations, and principles hereinafter set forth in the various relations to which they may be adapted without departing from the spirit of my invention as set forth more particularly in the following detailed disclosure of preferred embodiments thereof, and in the terms of the appended claims:

Figure 1 is a longitudinal vertical section, somewhat distorted, showing a preferred embodiment of the invention.

Figure 2 is a transverse sectional view taken substantially along line II—II of Figure 1.

Figure 3 is a transverse sectional view taken substantially along line III—III of Figure 1.

Figure 4 is a transverse sectional view taken substantially along line IV—IV of Figure 1.

Figure 5 is a transverse sectional view taken substantially along line V—V of Figure 1.

Figure 6 is a detailed sectional view taken substantially along line VI—VI of Figure 5.

Figure 7 is a transverse sectional view, the left half being taken along line VII—VII of Figure 1, and the right half being taken substantially along VII'—VII' of Figure 1.

Figure 8 is a detailed sectional view taken along line VIII—VIII of Figure 7.

Figure 9 is a transverse sectional view taken along planes indicated by line IX—IX of Figure 1.

Figure 10 is a fragmental detailed view showing the universal motor torque reacting ring construction.

Figure 11 is a fragmental detailed sectional view showing the method of mounting the trunnions for the motor torque re-acting ring.

Figure 12 is a transverse sectional view substantially along line XII—XII of Figure 1.

Figure 13 is a transverse sectional view taken along line XIII—XIII of Figure 1.

Figure 14 is a detailed sectional view taken along line XIV—XIV of Figure 13.

Figure 15 is a fragmental transverse sectional view taken along line XV—XV of Figure 16 showing a modification of the form of invention shown in Figure 1 in which a gear pump is driven from the driving shaft to supply fluid under pressure for the control of the mechanism.

Figure 16 is a longitudinal section taken along line XVI—XVI of Figure 15.

Figure 17 is a transverse sectional view showing a modified construction of the pump adapted for use in the form of invention shown in Figure 1.

Figure 18 is a fragmental transverse sectional view showing a modified arrangement for shifting the motor cylinder blocks longitudinally.

Figure 19 is a sectional view taken along line XIX—XIX of Figure 18.

Figure 20 is a fragmental longitudinal sectional view showing a modification of the mechanism shown in Figure 1, in which a clutch valve is interposed between the pump and motor.

Figure 21 is a sectional view taken on line XXI—XXI of Figure 20.

Figure 22 is a fragmental longitudinal sectional view of a modification of the form of invention shown in Figures 20 and 21.

Figure 23 is a sectional view taken along line XXIII—XXIII of Figure 22.

Figure 24 is a fragmental sectional view showing a modified construction for the motor angle drive mechanism.

Figure 25 is a section taken along line XXV—XXV of Figure 24.

Figure 26 is a fragmental longitudinal sectional view of another modification of the motor angle drive mechanism.

Figure 27 is a fragmental longitudinal sectional view of a further form of motor angle drive mechanism.

Figure 28 is a vertical longitudinal section of a further modification of the form of invention shown in Figure 1, in combination with a reversing gear mechanism and a jack shaft.

Figure 29 is a side elevation with parts broken away showing more or less diagrammatically the application of the form of transmission shown in Figure 28 to a Diesel locomotive.

As shown in Figure 1, the preferred form of transmission mechanism comprises a stationary supporting casing 1, provided with a cover plate 2 secured in poistion by the securing cap screws 3. Supported in the forward end of casing 1 is a ball or anti-friction bearing 4 in which a pump driving and supporting member 5 is journaled for rotation. Member 5 is provided with a splined tubular section which extends outwardly through a packing gland structure 6 formed in the forward end of casing 1, and in which the splined end of driving shaft section 7 slidably fits. Member 5 is provided with a flange 8 which is secured by means of cap screws 9 to the forward end of a tubular pump supporting and driving member 10. Member 10 is provided with flange 11 which is secured to pump cylinder block casting 12 by means of the securing cap screws or studs 13. Formed in the cylinder block 12 are a plurality of radial cylinders 14 preferably odd in number. As shown in Figures 2 and 17 nine cylinders are equally spaced radially in the cylinder block in the embodiment shown.

The outer end of each of the cylinders 14 is closed by a cap or head 15 threaded into the cylinder block and formed within each cylinder 14 is an inner cylinder 16 in which the radial pistons 17 are mounted for reciprocation. Secured in each of the pistons 17 (Figure 2) is a socket member 18 which is drawn and held in position by means of a nut 19. Ball ends 20 of piston rods 21 are held seated in spherical recesses in the socket members 18 by means of the securing caps 22 having a knurled outer surface and which in turn are threaded on the socket members 18 and locked from turning by a knurled frictional contact with the inner bore of piston 17. Formed on the inner ends of the piston rods 21 are bushed bearing sections 23 which are rotatably supported on wrist pins 24, reduced end sections of which are journaled in suitable bores formed in flanged extensions of ring members 25 and locked against turning. Ring members 25 are secured together by means of through bolts 26 and are provided centrally with a bore lined with bearing material 27, and are journaled for rotation on an eccentric 28. Eccentric 28 is formed integrally with a sleeve 29 (Figure 1) which is slidably splined to or on splined section 30 of the tail or driven shaft. One of the wrist pins 24 is provided with extensions 31 (Figures 1 and 2) on which rectangular bearing blocks 32 are journaled for rotation. Blocks 32 are slidably guided in slots 33 formed in flange 11 of the tubular drive member 10 and in a removable plate 34 in the pump cylinder block casting 12 respectively (Figure 1). There being no relative rotation between plate 34 and cylinder block 12.

Sleeve 29 is supported for rotation in ball bearings 35 mounted in the pump cylinder block casting 12 and in a ball bearing 36 supported in the interior bore of tubular member 10 and held in position and locked by a screw collar 37. Keyed to the forward end of sleeve 29 is a toothed clutch member 38. Sleeve 29 and clutch member 38 are held in assembled relation on the splined tail shaft section 30 by means of a thrust collar 39 and a securing nut 40 threaded on the forward end of tail shaft section 30.

Formed in the tubular member 10 are diametrically opposite slots 41 in which clutch members 42 (Figures 1 and 3) slidably fit. Clutch members 42 are provided with teeth adapted to mesh with the teeth of the clutch member 38 and are formed integrally with a cylindrical shift member 42'. Shift member 42' is divided in halves which are secured together by the securing bolts 43 and formed in the shift member is a peripheral groove in which split shift ring 44 fits. The halves of the ring 44 are secured together by cap screws 45 and are provided with diametrically opposite trunnions 47 which fit into and are actuated by the bifurcated ends of shift member 48. Shift member 48 is mounted on and actuated by spindle 49 which in turn is journaled in bushings 50 supported in suitable extensions of cover plate 2. One end of spindle 49 extends outward through the flange member 51 threaded into the cover plate and has secured thereto an operating lever 52. Lever 52 may be actuated by any suitable mechanism (not shown) to rock spindle 49 and shift member 48 counter clockwise in Figure 1 to shift cylindrical member 42' to the right meshing the teeth of the members 42 with the teeth of clutch member 38, and establishing a direct mechanical drive between the driving shaft section 7 and the tail shaft section 30 as will more fully hereinafter appear.

With the parts in the position shown in Figure 1, clutch members 38 and 42 are disengaged, and as the driving shaft is rotated, cylinder block 12 together with the parts assembled therein will be rotated through tubular member 10 and flange 11. With tail shaft section 30 stationary, or rotating at a different speed from the rotation of the driving shaft 7, a difference in or relative rotation between the eccentric 28 and the pump cylinders will occur. As rings 25 are connected to cylinder block 12 and the flange 11 by the bearing blocks 32 and guides 33 they will rotate with cylinder block 12 and with relation to eccentric 28. Rings 25 will accordingly have a rotary oscillating motion imparted thereto resulting in a reciprocation of the pistons 17 in the cylinder sections 16 producing a pumping action dependent upon the difference in rotation of the driving and driven shaft.

The other ends of the cylinders 16 communicate with annular fluid spaces 53 (Figures 1 and 2) formed between the walls of the cylinder sections 14 and 16, each space 53 in turn being connected by the fluid passages 54 individual thereto formed in cylinder block 12, to fluid ports 55 (Figure 4) formed in the fluid timing face 56 of pump cylinder block 12. It will be observed that the spaces, with which the cylinders communicate, are of such size and so related to the passages 54 that they permit quantities of oil, substantially equal to the piston displacements, to surge back and forth during operation without passing through the ports 55. Timing face 56 engages timing face 57 of valve plate 58 (Figure 5).

Formed in and extending through valve plate 58 is high pressure fluid timing port 59 and the low pressure fluid timing port 60. A relief valve 61 (Figures 5 and 6) disposed in valve plate 58 provides an outlet for the fluid from high pressure port 59 to the interior of the casing section 1 when excessive pressures are developed in the high pressure side of the system. Connecting low pressure port 60 with the interior of casing 1 are fluid intake ports 62. Valve plate 58 is provided with a centrally disposed spherically cupped seat and is held in position on the spherical surface 63 of universal supporting and driving member 64 by means of a securing plate 65 which in turn is held in position on the valve plate by counter-sunk screws 66 and locked. Secured to member 64 are diametrically opposite trunnions 67 on which bearing blocks 68 are rotatably supported. Bearing blocks 68 fit slidably in slots 69 formed in the inside of valve plate 58 and serve to provide a means to rotate the valve plate with the member 64 while permitting a universal seating movement of the valve plate with relation to pump valve face 56. Drive member 64 is slidably keyed to and driven by the tail shaft section 70 which is slidably journaled in self-aligning bearing 71 mounted in motor cylinder block 72 and held in position or locked by the screw ring 71'. (Figure 1.)

Motor cylinder block 72 is provided with a timing or valve face 73 (Figures 5 and 7) which is normally in engagement with the timing face 74 (Figure 6) of valve plate 58. Formed in valve face 73 are fluid ports 75 which communicate with the parallel motor cylinders 76 formed in the cylinder block 72. Cylinders 76 are preferably odd in number and spaced at equal angular distances in the cylinder block 72. As shown in Figure 7, nine cylinders are preferably utilized. Formed endwise in cylinder block 72 and extending to a point between bearing 71 and valve plate 58 are a series of fluid conduits 78 (Figure 7) which are connected to the exterior of cylinder block 72 by radial conduits 79. Conduits 78 are connected to the interior bore formed in cylinder blocks 72 by radial conduits 80. Conduits 78, 79 and 80 permit fluid to flow inward to the space in cylinder block 72 between valve plate 58 and bearing 71 without being forced to pass through the bearing 71 in operation of the device, and at the same time entrained air is permitted to rise upward from the space within the cylinder block into the casing section, avoiding the formation of emulsion in operation of the device.

Formed in cylinder block 72 around the exterior of cylinders 76 are water cooling jacket spaces 81 which are interconnected by the openings 82. Tapped into the wall of the cylinder jacket space are L connections 83 connected by flexible hose connections 84 to L fittings 85 secured in and extending through cover plate 2 of the transmission mechanism. Suitable connections for a cooling water supply may be made to the threaded projecting ends of L connections 85 and water for the purpose of cooling the motor cylinder block may be circulated continuously through the jacket spaces, without mixing with the operating fluid of the transmission.

Secured to the side of motor cylinder block 72 (Figure 7) by means of screws 86 are diametrically opposite and axially aligned trunnion members 87. The axes of trunnions 87 intersect the center of movement of self-aligning bearing 71, and trunnions 87 are journaled for rotation in self-aligned bearings 88. Bearings 88 are supported in elongated recesses 89 (Figure 8) formed in supporting members 90 which are secured on suitable projections of casing 1 by means of studs 91. Formed integrally with the ends of trunnion members 87 are actuating extensions 92 which are provided with spherical shaped peripheral surfaces and are supported in bearing blocks 93 in a manner permitting limited universal movement of the extensions 92 with respect to the blocks 93. Blocks 93 are mounted in actuating disks 94 in such manner that the centers of trunnion members 87 are eccentric with relation to the center of disks 94. Disks 94 are rotatably supported in suitable circular shaped seats formed in supporting members 90 and are provided with the actuating arms 95 secured to disks 94 by means of cap screws 96. Coil springs 97 interposed between actuating arms 95 and casing 1 normally hold the parts in the position shown in Figures 1 and 8 with timing face 73 of motor block 72 in engagement with face 74 of valve 58. The upper ends of arms 95 are connected by pins 98 to the inner ends of the actuating rods 99. Rods 99 are each connected by means of ball and socket connections 100 to actuating pistons 101 which are mounted for reciprocation in longitudinally aligned cylinders 102. Cylinders 102 are secured to cap 2 by means of securing cap screws 103 (Figure 7) and are secured to each other by the bolts 104. Operating fluid is supplied to cylinders 102 by any suitable means under the control of an operator to shift pistons 101 and arms 95 against the tension of springs 97. It will accordingly be seen that motor cylinder block 72 is supported from trunnion members 87 in a manner permitting limited universal seating movement of the motor timing face 73 on valve face 74. Coil springs 97 normally hold the timing face of the motor cylinder block against the valve timing face. When pistons 101 are operated to rotate arms 95 and disks 94 against the tension of springs 97, due to the eccentricity of the axis of trunnions 92 and bearings 88 with respect to the center of rotation of disk 94, trunnions 87 together with cylinder block 72 will be shifted to the right in Figure 1 separating timing faces 73 and 74 thereby interconnecting the high and low pressure fluid ports 59 and 60 of valve 58 through the medium of the oil in the case, thus declutching the transmission and establishing a neutral. Since the valve plate 58 and cylinder block 72 are permitted limited universal movement with relation to the tail shaft section 70, in operation of this form of the invention valve plate 58 and motor cylinder block 72 will align themselves with timing face 56 of pump cylinder block 12.

Mounted in each of the motor cylinders 76 is a reciprocating piston 105 to which the inner end of a piston rod 106 is connected by means of a suitable ball and socket connection in any well known maner. The outer ends of piston rods 106 are provided with ball members 107 which nest in spherically cupped seats of cylindrical thrust members 108. Thrust members 108 (Figures 1 and 9) are slidably mounted in bores formed in angle ring member 109 and balls 107 are adjustably held in position against the cupped seats of members 108 by means of the securing cap members 109' threaded into the bores for members 108. Formed in the outer end of each thrust member 108 is a hardened thrust member 110 provided with a spherical outer surface engaging a hardened thrust member 111 individual thereto and secured in thrust shoes 112. Thrust shoes 112 are lined on their outer faces with suitable bearing material such for example as babbit, and are slidably mounted in recesses formed in the ring member 109 by separating ribs 113 (Figure 9).

Ring 109 has formed integrally therewith or secured thereto in any suitable manner diametrically opposite trunnions 114 (Figures 1 and 9) which are mounted in suitable bearing bushings 115. Bushings 115 are secured between the overlapping ends of split universal ring sections 116 (Figures 9 and 10) which are secured together by means of securing bolts 117. Formed integrally on the split ring 116 are diametrically opposite trunnions 118, the aligned axes of which intersect the aligned axes of trunnions 114 at right angles and at the center of ring 109. Trunnions 118 are journaled in bearing blocks 119 which are slidably supported in supporting members 120 (Figure 11) secured to suitable projections of casing 1 by cap screws 121. Bearing blocks 119 are held to the left in Figure 11 and to the right in Figure 1 by means of helical springs 121'. Helical springs 121' nest in recesses formed in supporting members 120, and abut against bearing blocks 119 forcing the bearing blocks together with the universal ring 116, ring member 109, and parts carried thereby to the left in Figure 11 and to the right in Figure 1, holding the bearing faces of shoes 112 in engagement with the bearing face of angle driving member 122.

Angle member 122 is provided with a tubular sleeve or extension 123 on which are mounted the radial ball bearings 124 (Figure 1) and are held by means of securing collar 125 threaded on extension 123 and locked. Ring 109 is provided with a central bore in which the outer races of bearings 124 are mounted so that drive member 122 is rotatably supported from and angularly movable with ring 109. Formed centrally in extension 123 of drive member 122 is a driving slot into which an enlarged parallel sided driving section 126 (Figures 1 and 9) of the tail or driven shaft of the mechanism snugly fits. Rotatably mounted in aligned bores formed in extension 123 and section 126 of the tail shaft is a trunnion or pivot pin 127, the axis of which is in alignment with the axes of trunnions 118 and is held in position by the assembly of bearings 124 on extensions 123.

In operation, the motor with angle plate 122 and the related parts inclined with relation to vertical position as shown in Figure 1, will operate as follows:—as fluid is delivered successively to motor cylinders 76 under pressure, pressures are transmitted through pistons 105, piston rods 106, cylindrical thrust members 108, and shoes 112 to angle plate 122, causing angle ring 109 and the parts connected thereto to oscillate about trunnions 114 and 118 as centers transferring forces to the angle plate 122 which tend to re-act through the ring 116 to the supporting trunnions 118 to the stationary case 1 of the transmission and thus rotate the angle drive member 122 which in turn rotates the tail shaft through drive member 126 and pivot pin 127 as will be apparent to those skilled in the art. The amount of power being transmitted to the tail shaft in this way by the motor is variable and dependent upon the inclination of plate 122 with respect to a position normal to the axis of the tail shaft.

Formed integrally with backing or angle plate 122 are a plurality of projecting ears or lugs 128 (Figures 1 and 11) disposed on opposite sides of the tail shaft, and pivotally connected to ears 128 by means of pins 129 are pairs of actuating links 130 which are pivotally connected to and actuated by pairs of reciprocating pistons 131 (Figures 1, 11 and 12). Reciprocating pistons 131 are mounted in bores 132 formed in control cylinder block 133. Cylinder block 133 is slidably secured to end section 134 of the tail shaft and interposed between a shoulder on tail shaft section 134 (Figure 1) and the forward end of the cylinder block 133 is a helical spring 135 which holds the timing face 136 (Figure 12) of cylinder block 133 in engagement with timing face 137 of valve member 138 (Figures 1 and 13).

Formed in cylinder block 133 are annular 360 degree fluid passages or conduits 139 and 140 (Figure 1) connected to adjacent pairs of the fluid cylinders 132 by means of ports 141 and 142 respectively. The annular chambers 139 and 140 are connected by means of circular and concentric series of ports 143 and 144 (Figures 1 and 12) to face 136 of cylinder block 133. Ports 143 and 144 are successively brought into communication with ports 145 and 146 respectively (Figure 13) of stationary valve member 138. Valve member 138 is provided with a spherical or universal seating surface (Figure 1) and is seated in a suitable cup seat formed in the end casting 147 which is secured to the end of casing 1 by means of the cap screws or studs 148. Formed in valve member 138 are fluid conduits 149 and 150 which terminate in the spherical seating surface of valve member 138.

Formed in valve member 138 between conduits 149 and 150 are fluid conduits 151 which provided a passage for fluid to the rear face of valve plate 138 and out through openings 152 in end casting 147 to the interior of casing 1. Extending outward from the cupped seat for valve member 138 in casting 147 are fluid ports or conduits 152, 153, and 154 (Figure 13). Threaded in casting 147 and communicating with central conduit 154 is an L pipe fitting 155 which is connected through pipe connection 156 and coupling 157 to a fluid inlet connection 158 formed in casing 1. Extending through a cut-away portion 159 of casting 147 is an actuating extension 160 rigidly secured to valve member 138, and on the outer end of which is formed an actuating ball member 161. Ball member 161 is nested in a suitable ball seat formed in the lower end of actuating link 162 (Figures 13 and 14). Formed on the upper end of link 162 is a ball seat 163 (Figure 13) in which the ball end 164 of an actuating arm 165 is nested. The opposite end of arm 165 is supported and secured to the end of an actuating spindle 166 which is journaled in a bushing 167 (Figure 13) supported in a suitable bearing member 168 formed integrally with casing 1. The outer end of spindle 166 extends through a packing gland structure 169 and secured thereto is the lower end of control arm 170 which may be actuated by any suitable mechanism to control the position of valve member 138.

In operation, to control the angular position of disk 122 and the related parts, fluid under pressure is supplied at the will of the operator through a suitable pipe or conduit into connection 158, pipe 156, fitting 155 and conduit 154. With the valve in the position shown in Figure 13 the fluid will pass from conduit 154 through ports 151 and openings 152 (Figure 1) into the casing 1 and ports 149 and 150 will be sealed providing a hydraulic lock for pistons 131, holding drive member 122 and the related parts in a fixed angular position. When it is desired to rotate the angle disk 122 and connected parts counter-clockwise in Figure 1, arm 170 (Figure 13) is actuated to depress link 162 until actuating extension 160 of valve 138 comes into engagement with the lower edge of cut-away portion 159 of casting 147. In this position of parts, conduit 150 will be in communication with the interior of the casing through conduit 153 and conduit 149 will be brought into communication with conduit 154. Fluid under pressure admitted through connection 158 will now be forced from pipe 156 through conduit 149, port 145 of valve member 138 and ports 143, (Figure 12) into the upper cylinders 132 forcing the upper pistons in Figure 1 to the left causing rotation of drive member 122 and the connected parts counter-clockwise in Figure 1. This movement of the angle disk forces the lower pistons 131 to the right, and the fluid in the lower cylinders 132 will be forced outward through ports 144 and 146, conduits 150 and 153, into casing 1. When the parts have been brought to the desired angular inclination, arm 170 is actuated to restore valve plate 138 to the position shown in Figure 13 in which position the fluid will again be sealed in cylinders 132 and the parts will be hydraulically locked in the new fixed angular position. In similar manner, when it is desired to rotate drive member 122 and the related parts clockwise the arm 170 is actuated in Figure 13 to raise the link 162 until actuating extension 160 engages the upper edge of cut-away portion 159 of the casting 147 in which position conduits 149 and 150 of valve 138 will register respectively with the conduits 152 and 154. Fluid is then admitted under pressure through pipe 150 and port 146 into the lower pair of cylinders 132 in Figure 1, and the upper pair of cylinders 132 are placed in communication with the interior of the casing so that fluid will be forced into the lower cylinders and out of the upper cylinders shifting angle plate 122 and the related parts into its new position. The areas of the cylinder heads under pressure in relation to the ports that the fluid is delivered through are so proportioned that the valve plate 138 tends to automatically seat itself on its aligning seat in the casing 147 regardless of the magnitude of the internal pressure on the cylinders.

Tail shaft section 134 is journaled in self aligning bearing 171 held in position in end casting 147 by cover plate 173 which is secured in position by the securing bolts or cap screws 174. Secured to plate 173 is a packing gland structure 175 through which a tubular section of coupling member 176 extends. Coupling member 176 is secured to a tapered end section of the tail shaft by means of a suitable key and securing nut 178. Casing 1 is maintained full of oil which may be admitted through pipe 179 (Figures 1 and 9) which is secured to a cover plate 180 in turn secured to cap 2 by means of cap screws 181. Pipe 179 may be supplied by fluid from an elevated storage tank so that the fluid in the case is at all times maintained under a gravity head. Fluid may also be continuously circulated through pipe connection 158 (Figure 13) if desired by any suitable type of fluid circulating pump which may draw its supply of fluid from the casing 1 or the storage supply tank to continuously circulate fluid through the mechanism in addition to supplying fluid under pressure for controlling the angle of member 122 and the related parts.

*Operation*

To initiate operation of the mechanism so far described, the shaft 7 is driven and oil or operating fluid is fed into the casing 1 through pipe 179 (Figure 1) and passes inward through the ducts 78 and 79 (Figure 7) of the motor cylinder block to the fluid inlet port 62 (Figure 6) to low pressure port 60 of the valve plate 58. With drive member 122 and the parts carried thereby inclined as shown, a definite speed relation of the driving and driven shafts is established in the following manner. Rotation of shaft 7 rotates pump cylinder block 12 and the parts connected thereto with relation to pump eccentric 28 connected to the tail shaft producing reciprocation of pistons 17 which will cause fluid to be drawn inward through ports 62 and 60 of valve plate 58 into the pump cylinders, and as the pump cylinder ports are connected with port 59 of valve plate 58 the fluid, together with entrained air, will be forced through the port 59 into ports 75 of the motor cylinders connected to port 59, exerting a pressure on the corresponding motor pistons 105 which is transmitted through piston rods 106, members 108 and shoes 112 to the angle drive member 122, causing resultant forces which rotate the tail shaft at a speed with relation to the speed of rotation of the driving shaft that will depend upon the angle of inclination of the drive member 122. As the tail shaft rotates, the valve plate 58 will be driven therewith through its universal driving connection and the motor cylinders 76 will successively be connected with the high and low pressure ports 59 and 60 of valve 58 in timed relation with the operation of the pump pistons. As plate 58 rotates fluid will be fed outward by centrifugal force through the fluid inlet ports 62 from the fluid chamber in the center of the motor cylinder block, maintaining a pressure on the suction side of the pump which will aid the pump pistons to pick up the fluid at high speeds. As the operation continues, air entrained in the circulating fluid will expand as it reaches ports 62 and will pass inward due to expansion and action of centrifugal force into the central fluid storage space in the motor cylinder block, from where it will rise upward through the upper ducts 79 to the top of casing 1, and then will pass out through pipe 179 to the storage tank and to atmosphere. In this way the suction side of the circulating system is continually connected to atmosphere, and air entrained in the system is eliminated and rapidly replaced by fluid, tending to prevent foaming of the fluid or formation of so-called "emulsion."

As the torque demands on the tail shaft are lowered, drive member 122 may be tilted toward the vertical position under control of arm 170 (Figure 13) and valve 137 as above set forth, and shifted to the position where the prime mover driving shaft 7 can efficiently supply the torque demand to handle the load on the tail shaft. When the prime mover can handle the torque demands on the tail shaft directly, the member 122 may be brought to a position normal to the axis of the tail shaft when the counter-balancing extension 123 of member 122 will engage a limiting projection of tail shaft section 126 and further movement will be prevented. The driving and tail shafts will now be clutched together rotating at the same speed, and no pumping of fluid will occur.

In operation it will be noted that the end thrust on the tail shaft due to longitudinal thrust of the motor pistons on the drive member 122 is transmitted through nut 40 and collar 39 and bearing 35 to the pump cylinder block 12, holding the timing face, the pump cylinder block, valve plate 58, and the timing face of the motor cylinder block in engagement against the reactions due to the generation of fluid pressure tending to force the valve faces apart. In this manner the ports are held in sealing engagement with a predetermined pressure at the same time permitting expansion and contraction to occur in the valve plate and pump parts without causing binding or excessive leakage due to temperature variations. To reduce temperature variations and to maintain the mechanism at the temperatures for maximum efficiency, water or another suitable liquid may be circulated through hose connections 84 and the motor cylinder jacket for heating or cooling purposes as required. When used with an internal combustion engine the water from the cooling system for the engine may be utilized.

It will be seen by those skilled in the art that a torque multiplying hydraulic transmission has been provided in which any ratio of speed reduction and torque multiplication within the maximum limits of the device may be established by varying the inclination of drive member 122 together with the parts carried thereby with relation to a position normal to the axis of the tail shaft. The maximum reduction and torque multiplication will occur when the inclination of parts and capacity of the motor is greatest, while when the driving shaft and the tail shaft are rotating at the same speed with the parts in direct couple no pumping of fluid will occur. It will be noted in this disclosure of the mechanism that no reverse rotation of the tail shaft is provided.

To establish a neutral condition of the transmission, as hereinbefore set forth, pistons 101 are actuated to unseat valve face 73 of the motor cylinder block from the valve face 74 of valve plate 58 thereby interconnecting the high and low pressure fluid ports 59 and 60 of the valve plate through the casing, breaking the driving relation of the pump and motor so that driving shaft 7 may rotate without causing rotation of the driven shaft.

The form of invention so far described may be modified by providing as part of the mechanism a circulating oil pump for supplying fluid for control purposes to the pipe connection 158 (Figure 13) and to the storage tank that forms a part of the transmission. As shown in Figures 15 and 16, an end cap 183 is provided for the casing 1, in which the bearing 4 for the pump driving sleeve 5 is supported, and on which the packing gland 6 is formed. Formed in the cap member 183 is an oil chamber 184 (Figure 16) in which spiral pump driving gear 185 formed integrally with an extension of the pump driving sleeve 5 is positioned. Spiral gear 185 meshes with and drives a spiral pinion 186 formed or secured on the shaft 187. Shaft 187 is journaled in a bushing 188 supported in removable bearing member 189 threaded into the cap member 183, and in a bushing 190 supported directly in the cap member. Secured to and driven by the lower end of the shaft 187 is a pump gear 191 which meshes with a suitable pump gear 192. Fluid from the casing section or chamber 184 passes through a suction port 193 to the pump gears 191 and 192 and is forced through the port 194 into conduit 195. Relief valve 196 prevents the building up of excessive pressures by the pump gears in operation of the mechanism.

Rotation of shaft 7 rotates sleeve 5 and driving gear 185. Gear 185 drives pinion 186, rotating pump gears 191 and 192 to draw fluid from the casing 1 forcing it out through the pipe 195 under pressure for control purposes and to the fluid storage reservoir if desired to continuously maintain a circulation of fluid through the transmission casing, the withdrawn fluid being filtered for the purpose of removing dirt, grit, and the like.

As shown in Figure 17, the pump construction may be modified by making the inner cylinders 16' inserted by means of threads into cylinder block 12 instead of being cast integrally with the cylinder blocks as shown in Figure 2. To reduce frictional resistance, bearing metal 27' may be made in stepped sections of varying thickness to decrease the coefficient of friction between the eccentric 28 and the actuating ring members 25 of the pump in operation of the device.

In Figures 18 and 19 a modified arrangement for shifting the motor cylinder block for declutching purposes is disclosed. In this form of the invention the self-aligning bearings 88 in which the motor trunnions 87 are supported are mounted in the elongated recesses 89 which are formed in the supporting members 198 secured to suitable supporting projections of casing 1 by means of the studs 199 (Figure 19). Formed integrally with each trunnion 87 is an actuating extension 200 on which is supported ball bearing 201, the outer race of which fits slidably into angular cam slot 203 of actuating member 204. Each member 204 is supported for vertical sliding movement in a slot 205 formed in its supporting member 198. Cover plates 206 secured to supporting members 198 by the studs 207 hold the actuating members 204 in proper position. Caps 208 formed in the casing section 1 provide easy access to cover plates 206.

Pivotally secured to the upper end of each actuating member 204 by means of a pin 209 is the bifurcated end of piston rod 210. Piston rods 210 extend into actuating cylinders 211 and the upper ends thereof are secured to the actuating pistons 212 mounted for reciprocation in the cylinders 211. Helical springs 213 disposed between the lower ends of the cylinders 211 and pistons 212 normally hold the pistons 212 together with the actuating members 204 in their upper position, and hold motor cylinder block 72 with the valve face 73 thereof against the valve face 74 of the valve plate 58, and face 57 against face 56 of the pump cylinder block 12.

In operation of this modified shifting mechanism, to declutch the apparatus, fluid under pressure is supplied to the cylinders 211 through pipes 213, and the pistons 212 together with actuating members 204 are forced downward. As actuating members 204 move downward cam slot 203 thereof acting on bearing members 201 and extensions 200 of the motor trunnions 87 force the motor cylinder block to the right in Figure 19, unseating the timing face 73 from the valve face 74 and interconnecting the high and low pressure ports 59 and 60 of valve 58 through casing section 1.

When it is desired to clutch the mechanism for driving purposes, the pressure in the pipe 213 is relieved and fluid under pressure is forced through pipe 214 into the cylinders 211 aiding spring 213 to force pistons 212 upward. As pistons 212 move upward the actuating members 204 are drawn upward and cam slots 203 force motor cylinder block 72 to the left in Figure 19, seating the cylinder block valve face 73 on the valve plate face 74, and re-establishing the driving connection between the driving and driven shaft. The shape of the cam groove can be made to regulate the seating speed of the valve face 73.

In the forms of invention so far described, the clutching is performed by shifting the cylinder blocks endwise and the entire casing surrounding the pump and motor parts is filled with oil. In Figures 20 and 21 a modified form of the mechanism is disclosed in which the necessity for shifting the cylinder blocks to effect clutching operations is eliminated and the fluid surrounding the pump and valve parts in the casing 1 is removed, reducing resistance to motion of the parts rotating while the transmission is in direct couple. In this form of the invention, the motor cylinder block 72 has formed integrally therewith flanges 215 to which forward and rear sections of the casing 1 surrounding the pump and motor respectively are secured by means of suitable bolts or studs, the casing section surrounding the motor cylinder block 72 being eliminated exposing the outer surface of the motor cylinder block directly to atmosphere to aid in the cooling of the mechanism. By this arrangement it will be seen that the forward section of the casing 1 surrounding the pump and valve is completely separated from the rear casing section by the construction of the motor cylinder block and valve plate 58, and fluid with the exception of that due to leakage is eliminated from the casing section surrounding the pump and valve parts. The rear casing section, however, is surrounded with fluid, and the fluid enters the central fluid recess formed in motor cylinder block 72, and passages 216 in the motor cylinder block establish a communication between ports 62 of valve 58 and the interior of the rear casing section 1, so that a fluid will be fed to the suction side of the pump through ports 62, and the entrained air will pass outward through these ports as heretofore set forth into the rear casing section 1 and out to atmosphere.

To provide for clutching of the apparatus in this form of invention, motor cylinder block 72 is provided with a convex spherical face 217 on which the complemental concave spherical face of clutch valve plate 218 is rotatably seated. Formed on plate 218 is a valve motor timing face 219 which seats against the timing face 74 of valve 58, and formed in the clutch plate 218 are the fluid ports 220 which are shaped and spaced to align with the fluid ports 75 of motor cylinder block 72. Clutch plate 218 is provided with a stop projection 221 (Figure 21) which in the power transmitting operation of the device, abuts against a stop 222 and is held in this position by the frictional drag of the valve plate 58 on surface 219 as the valve plate 58 rotates with the tail shaft. In the neutral or declutching position of valve plate 218, the plate is shifted until projection 221 engages a stop 223 formed integrally with motor cylinder block 72. To provide for a shifting of plate 218 for clutching purposes, a gear segment 224 is formed integrally with the plate 218, the teeth of which mesh with the teeth 225 of a sliding rack member 226. Formed integrally with the ends of the rack member 226 are pistons 227 to the ends of which the packing members 228 are secured to prevent leakage around the pistons. Pistons 227 are mounted for reciprocation in cylinders 229 formed integrally with the forward casing section 1. The ends of cylinders 229 are closed by the caps 230 in which the threaded openings 231 are formed to receive the threaded ends of fluid conduits for operating fluid for the pistons 227.

In power transmitting and torque multiplying operation of the form of clutch mechanism shown in Figures 20 and 21, the ports 220 of clutch plate 218 are in alignment with ports 75 of the motor cylinders, and the fluid is forced from port 59 into the motor cylinders and is delivered into the suction side of the pump cylinder blocks 212 through ports 60. When it is desired to throw the transmission into neutral or to declutch, fluid is admitted to the left cylinder 229 and exhausted from the right cylinder 229 in Figure 21, forcing shifting rack 226 to the right and rotating clutch plate 218 counter-clockwise in Figure 21 until member 221 thereof engages the stop 223. In this position of the clutch plate 218, the ports 220 of the clutch plate will overlap adjacent ports 75 of the motor cylinders so that all of the motor cylinders will be interconnected and the fluid will circulate from the high pressure port 59 of valve plate 58 to the low pressure port 60 through the circulating path established in this way without exerting a substantial driving effect on the motor cylinders as the fluid will follow the path of least resistance and shaft 7 may be rotated while the tail shaft remains stationary. When it is desired to re-establish the driving connection between the driving and driven shaft, plate 218 is rotated clockwise in Figure 21 to again align clutch ports 220 with the motor cylinder ports 75. As the stop projection 221 moves from stop 223 towards stop 222 the amount of the area through which fluid may by-pass or circulate independently of the operation of the motor, is gradually reduced, giving a gradually decreasing slip between the driving and driven shaft, which may be utitlized to give a smooth clutching operation, and to secure smooth starting of the transmission under load, in a manner that will be obvious to those skilled in the art.

In Figures 22 and 23, a modification of the form of invention shown in Figures 20 and 21 is disclosed. In this form of the invention the valving and clutching arrangements are the same as shown in Figures 20 and 21. The motor cylinder block 72, however, is modified by having formed integrally therewith oil reservoir or storage space 232 closed by a cover plate 233 which is provided with a filling dome 234 and a filter screen 235 located in the filling dome. Filling dome 234 is closed by a screw plug 236 through which the mechanism may be filled with fluid and formed in plug 236 are the air outlets 237 (Figure 22) to permit the escape of air entrained in the fluid. The fluid withdrawn from the transmission and circulated by the pump, in this form of the invention, is returned through conduit 238 to the storage reservoir 232. Storage space 232 is connected by fluid passages 239 to the storage space 240 formed centrally in the cylinder block. Space 240 is closed by a cap 241 in which a central opening 242 for the tail shaft is provided. Held seated against a concave spherical sealing seat of cap 242 is the spherical end of a sealing sleeve 243 which is yieldingly held in position, the sealing surfaces being held in engagement by a coil spring 244 surrounding the sealing sleeve 243 and interposed between a shoulder thereof and a stationary self-aligning bearing 71.

In operation of this form of invention, the fluid supply is stored entirely within the cylinder block 72 and the only fluid in the space of the casing section 1 surrounding the pump valve and motor parts is that due to leakage from the circulating system and storage tank or what is required to lubricate the parts so that in this form of the invention neither the pump nor the motor parts rotate substantially in fluid. Otherwise the operation is as heretofore set forth.

In Figures 24 and 25 a modified form of motor construction is disclosed. In this form of invention the driving shoe construction for the drive member 122 is eliminated and replaced by combined radial and angular thrust ball bearing 240, the inner race of which is mounted or secured to the drive member 122 and the outer race of which is mounted in angle plate 109 as shown in Figure 24. Formed integrally on or secured in the angle plate 109 is a single pair of diametrically opposite trunnions 241 on which are supported the ball bearings 242, the outer races of which are slidably mounted for oscillation in guide channels 243 which are formed in inserts 244 secured in position in supporting ring sections 245 by means of the securing screws 246. Ring sections 245 are secured together by through bolts 247 into a unitary supporting structure which is slidably supported in a suitable bore formed in a cylindrical section 248 of casing 1. Ring sections 245 are secured against rotation in the casing section 248 by means of key 249. Formed in the ring members 245 are the concave spherical surfaces 250 having a common center in assembled relation of the parts at the center of oscillation of the angle disk 109. The periphery of angle disk 109 is of convex spherical shape fitting slidably in the spherical seat formed by surfaces 250 of the ring members 245.

Seated in recesses in the forward ring member 245 are the coil springs 251, the forward ends of which abut against the end wall of casing section 248, springs 251 being normally under compression urging the supporting ring structure to the right in Figure 24.

In operation of this form of the invention, the motor pistons 105 oscillate angle plate 109 about the center of spherical surfaces 250 as an axis, causing rotation of the drive member 122 and tail shaft 70, angle ring 109 being held against rotation by trunnions 241 and bearings 242 but will be free to tilt about the axis of pin 127 and the aligned axes of trunnions 241. As the spherical surface of angle ring 109 is in sliding contact with spherical surfaces 250, substantial deflection of the tail shaft under load due to the motor reactions will be prevented. It will be seen that springs 251 force rings 245 together with the angle ring 109 and tail shaft to the right in Figure 24, taking up the lost motion in operation of the device and holding the parts in assembled relation.

The forms of the invention shown in Figures 24 and 25 may be modified as shown in Figure 26 by substituting for the ball bearing 240 an angular thrust roller bearing 252 to take heavier loads. The functioning of this form of the invention is substantially the same as shown in Figures 24 and 25 and will not be described in detail.

In Figure 27 the form of invention shown in Figure 26 is modified by substituting for radial ball bearing 124 the angle thrust roller bearing 253, and by threading the trunnions 241' into the angle ring 109 instead of forming the trunnions integrally therewith as shown in Figure 26, otherwise the functioning of this form of invention is the same as that shown in Figure 26, and for a full understanding of the operation thereof will be had by reference to the description hereinbefore given.

In the forms of invention so far described, no provision is made for reversing the tail shaft. It is, however, frequently desirable as for example, in locomotive and rail car drive mechanisms to provide a reverse drive of equal efficiency in either direction. To meet the conditions of operation for a locomotive or railcar drive the form of invention disclosed in Figures 28 and 29 has been devised. The main transmission mechanism is substantially the same as that shown in Figure 1 with the exception that the means for establishing direct mechanical couple between the driving and the tail shaft is eliminated, and minor details of construction are varied for the purpose of adapting the mechanism to heavy duty work which will be apparent to those skilled in the art on inspection and need not be specifically described. In this form of my invention securing nut 40 threaded on the forward end of the tail shaft engages a collar 254 provided with a convex spherical aligning surface which seats on a complemental concave seating surface of the thrust collar 255 which engages a heavy duty thrust bearing structure 256 of the Kingsbury or similar well known type. Thrust bearing 256 is secured in the pump actuating sleeve member 10 and transmits the end thrust of the tail shaft due to the motor reactions to pump cylinder block 12 and valve plate 58 to hold the pump and valve parts in assembled relation in the manner hereinbefore set forth.

The rear end of the casing 1 is provided with a supporting ring in which casting 147 is supported, and the casing section 1 is extended beyond casting 147 forming a reversing gear case 257. Supported in casting 147 is a bearing cage 258 in which are mounted thrust ball bearing 259, and radial roller bearing 260 for driving quill 261 of bevel pinion 262. Quill 261 and bevel pinion 262 are formed in a unitary structure and keyed to the end of and driven by the tail shaft. Bevel pinion 262 meshes with a pair of master bevel gears 263 disposed on opposite sides thereof and driven in opposite directions. Bevel gears 263 are journaled for rotation on the cross shaft 264 which is suitably journaled in bearing 265 (Figure 29) of the casing section 257. Slidably splined to the central section of shaft 264 and disposed between the master gears 263 is a clutch member 266 provided on its outer ends with clutch teeth (not shown) that are adapted in the mid position of the clutch member 266 to be disengaged from both gears 263 and when shifted endwise on the shaft 264 to either extreme position are adapted to engage either one or the other of the bevel gears 263, establishing a driving connection between one of the bevel gears and the shaft. The direction of rotation of shaft 264 depends upon which of the gears 263 is connected by clutch member 266 to shaft 264, as will be obvious to those skilled in the art. Clutch member 266 is provided with diametrically opposite shifting trunnions 267 which fit slidably into actuating slots of the shift arms 268. Shift arms 268 are keyed to and actuated by a vertical shaft 269 journaled at its ends in casing section 257. Secured to shaft 269 is an actuating arm 270 which is pivotally connected to an actuating rod 271 in turn actuated by a pair of control cylinders 272. In operation of the device, cylinders 272 are controlled to shift the clutch member 266 into its intermediate or neutral position in which no driving connection is established to the cross shaft 264, or to shift clutch member 266 to establish a driving connection between either gear 263 depending upon the direction in which it is desired to drive the cross-shaft 264.

In Figure 29 the arrangement of the transmission shown in Figure 28 in a Diesel driven locomotive is disclosed. The transmission is supported on the usual side frame members 273 of a locomotive and on which the Diesel engine 274 driving the shaft 7 of the transmission is mounted. Secured to the outer ends of and driven by the shaft 264 are gears 275 which are disposed inside of the side frame members 273 and protected by gear casings 276. Gears 275 mesh with and drive gears 277 in turn mounted on a countershaft 278. Shaft 278 is of shorter length than the distance between frames 273 and is supported from the frames by overhanging bearings 279 in such manner that it may be dropped downward vertically between the side frames 273 without disturbing the main transmission mechanism. Gears 277 mesh with and drive gears 280 which are mounted on and drive a jack shaft 281. Jack shaft 281 is journaled in suitable bearings supported from the side frame 273 and secured to the outer ends thereof are the crank arms 282 which are secured by the wrist pins 283 to the driving rods 284 of the locomotive. Rods 284 are secured by pins 285 to and drive the driving wheels 286 of the locomotive in a manner that will be apparent to those skilled in the art. Wheels 286 are connected to driving wheels 287 and 288 by the usual forms of connecting rods 289 and crank pins 290. The remaining construction not described is that usually utilized in locomotive constructions as will be understood by those skilled in the art.

By the arrangement of gearing shown, the jack shaft 281 may be removed and then the counter-shaft 278 together with gears 277 may be dropped vertically out of position.

Having described preferred embodiments only of my invention, it will be apparent to those skilled in the art that wide variations may be made in the details hereinbefore set forth, without departing from the spirit of my invention as defined by the appended claims. Accordingly, what is desired to be secured by Letters Patent and claimed as new is:

1. A hydraulic transmission comprising a stationary casing designed to contain a quantity of operating fluid; driving and driven shafts rotatably supported in said casing; a fluid motor driving said driven shaft including non-rotatable motor cylinders; a fluid pump comprising an annular recessed means actuated by said driving shaft and complemental means fitting into said recesses and connected to said driven shaft to effect the pumping of fluid; and fluid distributing means actuated by said driven shaft interposed between said pump and said motor, said distributing means being provided with passages for periodically connecting the interior of said casing with said motor cylinders and pump recesses for the purpose of supplying operating fluid to, and removing any entrained gases from, said cylinders and recesses.

2. The combination as set forth in claim 1 in which said annular recessed means comprises a cylinder block, and said complemental means comprises a plurality of reciprocating pistons.

3. The combination as set forth in claim 1 in which said annular recessed means comprises a radial cylinder block and said complemental means comprises a plurality of radial pistons.

4. The combination as set forth in claim 1, together with means for coupling said annular recessed means mechanically to said driven shaft.

5. In a hydraulic transmission, a driving shaft; a driven shaft; a cylinder block actuated by said driving shaft comprising a plurality of radial cylinders; a plurality of reciprocating pistons disposed in said cylinders actuated by said driven shaft; a fluid motor actuated by fluid delivered by said pump driving said driven shaft; and means for mechanically interconnecting said cylinder block and said driven shaft.

6. In a hydraulic transmission, a driving shaft; a driven shaft; a radial cylinder pump actuated by the difference in rotation of said driving and said driven shafts; a hydraulic motor actuating said driven shaft and aligned with said pump; and a fluid distributing valve plate disposed between said pump and said motor and actuated by said driven shaft to distribute fluid between said motor and said pump.

7. The combination as set forth in claim 6 in which said fluid motor comprises a plurality of non-rotatable cylinders and said valve plate is coupled by a universal drive connection to said driven shaft.

8. A hydraulic transmission comprising a driving means; driven means; a fluid pump operated by the difference in speed of rotation of said driving and said driven means; a single rotatable valve universally mounted on said driven means in engagement with said pump; and a hydraulic motor comprising a valve face normally engaging said rotatable valve actuating said driven means; said valve having passages for distributing fluid between the pump and the motor, and serving to maintain an effective seal between itself and both the pump and the motor.

9. In a hydraulic transmission; a driving shaft; a driven shaft; a pump operated by the difference in speed of rotation of said driving and said driven shafts; a hydraulic reciprocating piston motor driving said driven shaft comprising a non-rotatable cylinder block; a casing enclosing said pump and said motor; a ported valve actuated by said driven shaft interposed between said pump and said motor, said valve having normally open passages leading from certain of the valve ports and opening into the interior of said casing to permit the escape of any entrained air into the latter; and means for moving said cylinder block endwise with relation to said valve.

10. A hydraulic motor comprising a rotatable shaft; a driving member supported on said shaft for rotation therewith; a non-rotatable oscillating drive means journaled for rotation on said driving member; a plurality of piston rods actuating said oscillating means; a non-rotatable cylinder block, and a plurality of pistons actuating said piston rods mounted in substantially parallel cylinders formed in said non-rotatable cylinder block; and a timing valve for said cylinders driven by said shaft; and fluid operated means mounted on said shaft for controlling the extent of oscillation of said oscillating means.

11. In a hydraulic transmission, a driving shaft; a driven shaft; a fluid pump actuated by the difference in relative rotation of said driving and said driven shaft; a fluid motor driving said driven shaft; a stationary casing enclosing said pump and said motor; fluid distributing means between said motor and said pump; and hydraulic control means mounted within said stationary casing in association with said motor for varying the volumetric capacity of the latter.

12. The combination as set forth in claim 11 in which said hydraulic means is operable to hydraulically lock said motor in any desired position between the minimum and maximum volumetric capacities of said motor under the control of an operator.

13. The combination as set forth in claim 11 together with means actuated by said driving shaft for supplying operating fluid to said hydraulic control means.

14. In a hydraulic transmission apparatus, a driving shaft, a fluid pump connected thereto and comprising a housing portion having complemental pumping means relatively movably housed therein, a driven shaft, a fluid motor actuating said driven shaft and connected thereto to transmit pressure reactions longitudinally thereof, and means at one end of said driven shaft abutting said housing portion of the pump to cause said pressure reactions to thrust said housing portion toward said motor during operation of the transmission.

15. In a hydraulic transmission apparatus, a driving member, a driven shaft, a hydraulic pump comprising a rotary recessed body portion connected to said driving member and a rotatable complemental portion actuated by said driven shaft and coacting with said recessed body to pump fluid, a motor utilizing the pumped fluid and connected to said driven shaft to actuate the same said motor being designed to cause the pressures of the pumped fluid to react upon said driven shaft with a tendency to thrust the latter longitudinally away from the pump, and means upon said driven shaft engaging said recessed pump body to force the latter toward the motor in response to said longitudinal thrust of the driven shaft.

16. In the apparatus defined in claim 15, a ported plate valve disposed between the motor and said body portion of the pump with its opposed surfaces in fluid sealing contacts therewith, said plate valve being universally mounted upon said driven shaft in order that said fluid sealing contacts may be properly maintained at all times in response to said longitudinal thrust.

17. In the apparatus defined in claim 15, said motor having a stationary body portion mounted to rock universally about a point in the axis of said driven shaft, and a distributing valve disposed between said rotary pump body and said stationary motor body with its opposite surfaces in fluid sealing engagement therewith.

18. In the apparatus defined in claim 15, a plate valve actuated by said driven shaft, and a recessed body portion forming a part of said motor, said valve and said motor body portion each being mounted to rock universally about a point in the axis of the driven shaft, whereby said longitudinal thrust resulting from said pressure reactances always maintains the opposite faces of said plate valve in fluid sealing contact with said pump and motor body portions respectively.

19. A hydraulic transmission apparatus comprising a driving member, a driven shaft, a pump comprising complemental units actuated by said driving member and said shaft respectively, said shaft projecting through said pump and carrying means abutting one side of said pump, a motor mounted upon said driven shaft at the opposite side of said pump, said motor comprising a cylinder block receiving a plurality of pistons with their axes substantially parallel to said driven shaft and a corresponding plurality of piston rods connected to the driven shaft so as to tend to thrust the latter longitudinally in a direction away from the pump during the power strokes of the pistons, and a plate valve disposed between said pump and said motor cylinder block with its opposite faces maintained in fluid sealing engagement therewith as a result of the driving reactions of said motor.

20. In a hydraulic transmission apparatus; a driving shaft; a driven shaft; a pump comprising a plurality of radially arranged pistons reciprocable by one of said shafts and a rotatable block actuated by the other of said shafts; said block comprising a set of cylinders receiving said pistons, an auxiliary chamber surrounding each cylinder and in constant communication therewith, and a single port connecting each chamber with the outer surface of the cylinder block; and a motor for driving said driven shaft; and means for distributing fluid between said pump ports and said motor.

21. In a hydraulic transmission apparatus; a driving shaft; a driven shaft; a pump comprising a plurality of radially arranged pistons reciprocable by one of said shafts and a rotatable block actuated by the other of said shafts; said block comprising a set of cylinders receiving said pistons, an auxiliary chamber external of each cylinder and in communication therewith, and a single port connecting each chamber with the outer surface of the cylinder block; said auxiliary chamber being of sufficient volumetric capacity to permit a quantity of oil equal to the piston displacement to surge back and forth therein without passing through said port; a motor for driving said driven shaft; and means for distributing fluid between said pump ports and said motor.

22. In the apparatus defined in claim 20, said ports being radially arranged in substantially more closely spaced relation with repect to said driven shaft than are the innermost portions of the cylinders, whereby the operating fluid is fed outwardly into said cylinders by centrifugal force and access of any entrained air is prevented.

23. In the apparatus defined in claim 20, a portion of each auxiliary chamber comprising a cap-shaped part having a central projection extending inwardly axially of the corresponding cylinder.

24. A hydraulic transmission apparatus comprising a casing open to atmosphere, a driving shaft, a driven shaft, a rotating pump comprising complemental units actuated by said respective shafts, a motor for receiving fluid from said pump to actuate said driven shaft, and a valve designed to distribute operating fluid between said pump and said motor, said valve being rotated by said driven shaft and including an inclined suction passage in communication at its inner end with the interior of said casing whereby operating fluid is fed to the pump by centrifugal force and any entrained air is permitted to expand into the casing and to escape to atmosphere.

In testimony whereof I affix my signature.

ALDEN G. RAYBURN.